(12) United States Patent
Balatzis et al.

(10) Patent No.: US 12,047,550 B2
(45) Date of Patent: Jul. 23, 2024

(54) THREE-DIMIENSIONAL POINT CLOUD GENERATION USING MACHINE LEARNING

(71) Applicant: FARO Technologies, Inc., Lake Mary, FL (US)

(72) Inventors: Georgios Balatzis, Fellbach (DE); Francesco Bonarrigo, Ghedi (IT); Andrea Riccardi, Rezzato (IT)

(73) Assignee: FARO Technologies, Inc., Lake Mary, FL (US)

( * ) Notice: Subject to any disclaimer, the term of this patent is extended or adjusted under 35 U.S.C. 154(b) by 204 days.

(21) Appl. No.: 17/695,352

(22) Filed: Mar. 15, 2022

(65) Prior Publication Data
US 2022/0311987 A1    Sep. 29, 2022

Related U.S. Application Data

(60) Provisional application No. 63/165,399, filed on Mar. 24, 2021.

(51) Int. Cl.
*H04N 13/271* (2018.01)
*G03B 35/12* (2021.01)
*G06T 7/521* (2017.01)
*G06T 7/593* (2017.01)
*G06T 7/80* (2017.01)
*H04N 13/239* (2018.01)
*H04N 13/246* (2018.01)
*H04N 13/254* (2018.01)
*H04N 23/90* (2023.01)
*H04N 13/00* (2018.01)

(52) U.S. Cl.
CPC .......... *H04N 13/271* (2018.05); *G03B 35/12* (2013.01); *G06T 7/521* (2017.01); *G06T 7/593* (2017.01); *G06T 7/85* (2017.01); *H04N 13/239* (2018.05); *H04N 13/246* (2018.05); *H04N 13/254* (2018.05); *H04N 23/90* (2023.01); *G06T 2200/04* (2013.01); *G06T 2207/10028* (2013.01); *G06T 2207/20081* (2013.01); *G06T 2207/20084* (2013.01); *G06T 2207/20228* (2013.01); *H04N 2013/0081* (2013.01)

(58) Field of Classification Search
CPC .............................. H04N 13/271; G06T 7/521
USPC ........................................................ 348/47
See application file for complete search history.

(56) References Cited

U.S. PATENT DOCUMENTS

2019/0005670 A1\* 1/2019 DeTone ................... G06T 7/593
2019/0385360 A1\* 12/2019 Yang .................. G01C 21/3837
(Continued)

OTHER PUBLICATIONS

Li et al.; "Surface Reconstruction Based on Computer Stereo Vision Using Structured Light Projection"; 2009 International Conference on Intelligent Human-Machine Systems and Cybernetics; Aug. 26-27, 2009; pp. 451-454.

*Primary Examiner* — Amir Shahnami
(74) *Attorney, Agent, or Firm* — McCarter & English, LLP; Dave S. Christensen

(57) ABSTRACT

An example method for training a machine learning model is provided. The method includes receiving training data collected by a three-dimensional (3D) imager, the training data comprising a plurality of training sets. The method further includes generating, using the training data, a machine learning model from which a disparity map can be inferred from a pair of images that capture a scene where a light pattern is projected onto an object.

19 Claims, 37 Drawing Sheets
(10 of 37 Drawing Sheet(s) Filed in Color)

(56) References Cited

U.S. PATENT DOCUMENTS

2020/0302629 A1* 9/2020 Jie .......................... G06N 3/048
2021/0110018 A1* 4/2021 Rowe ..................... G06V 10/82
2022/0230018 A1* 7/2022 Kundu .................... G06T 7/593

* cited by examiner

SECTION A-A

SECTION B-B

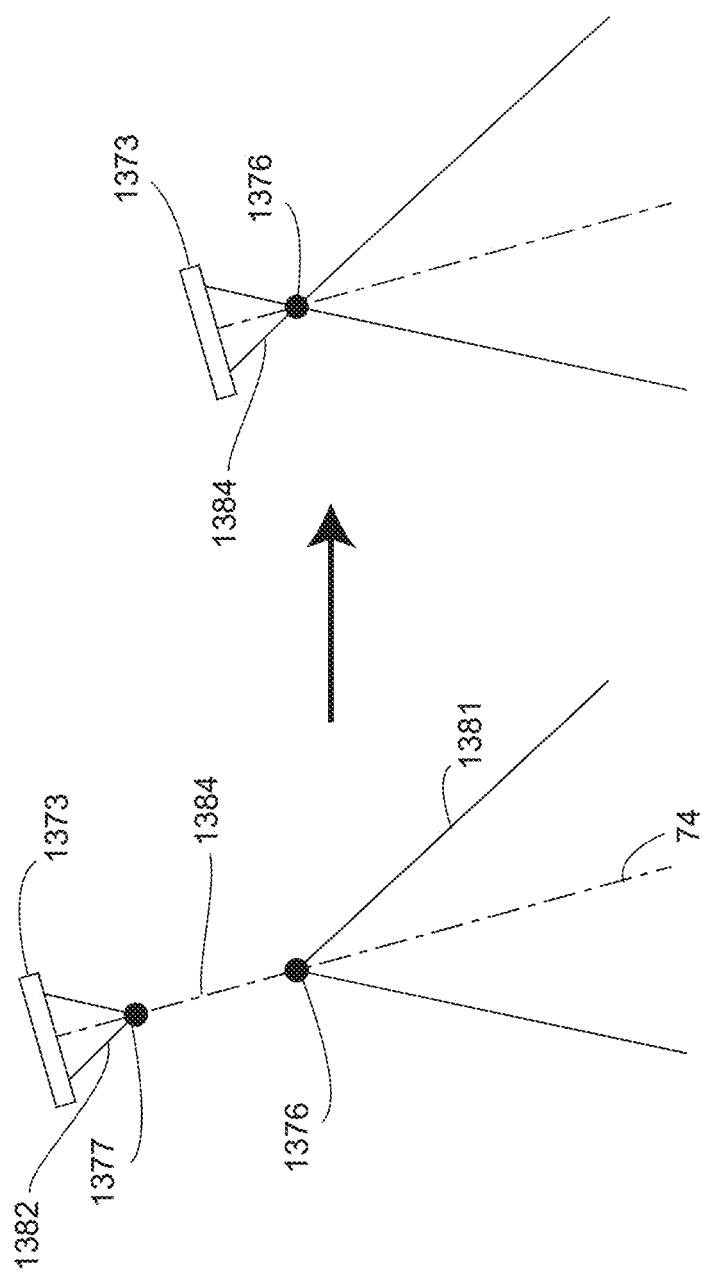

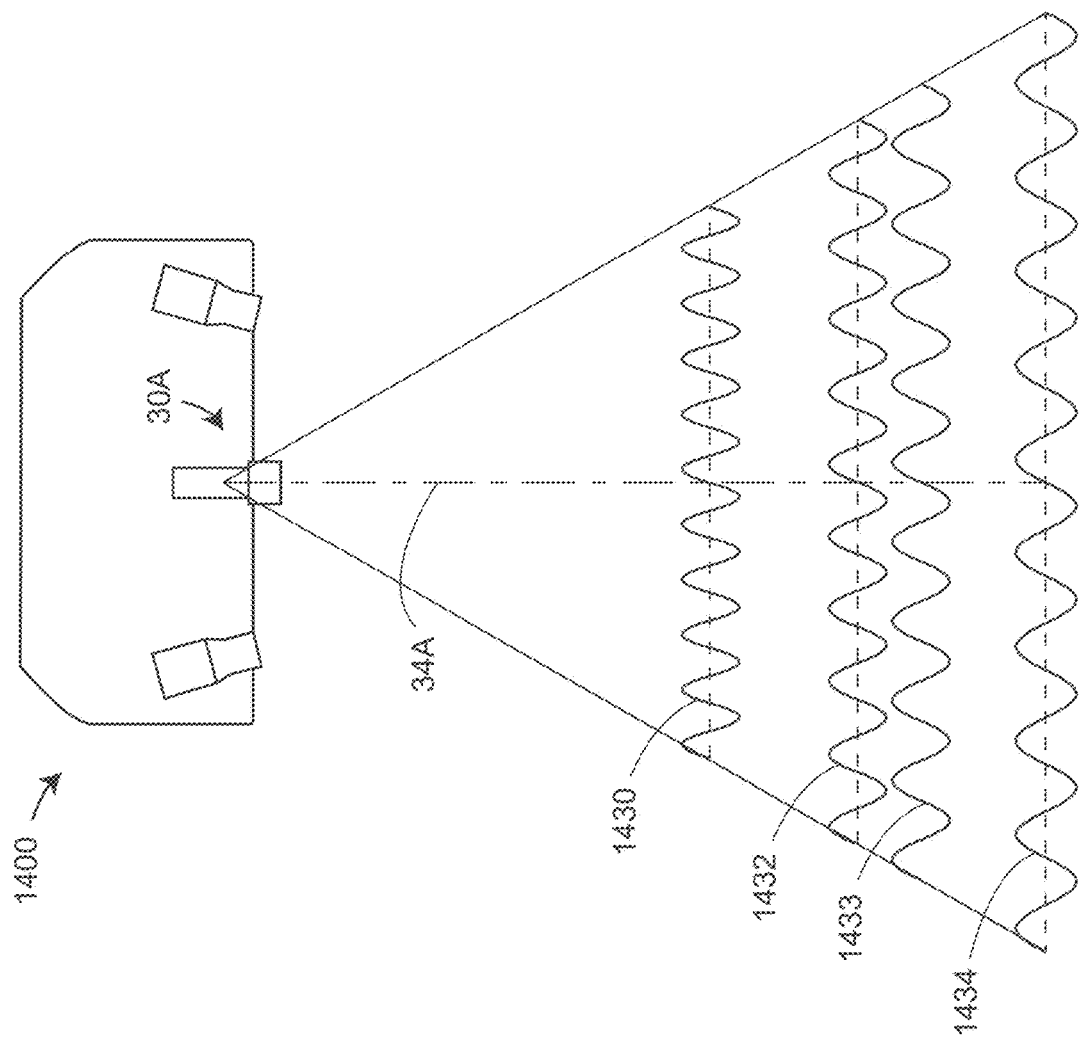

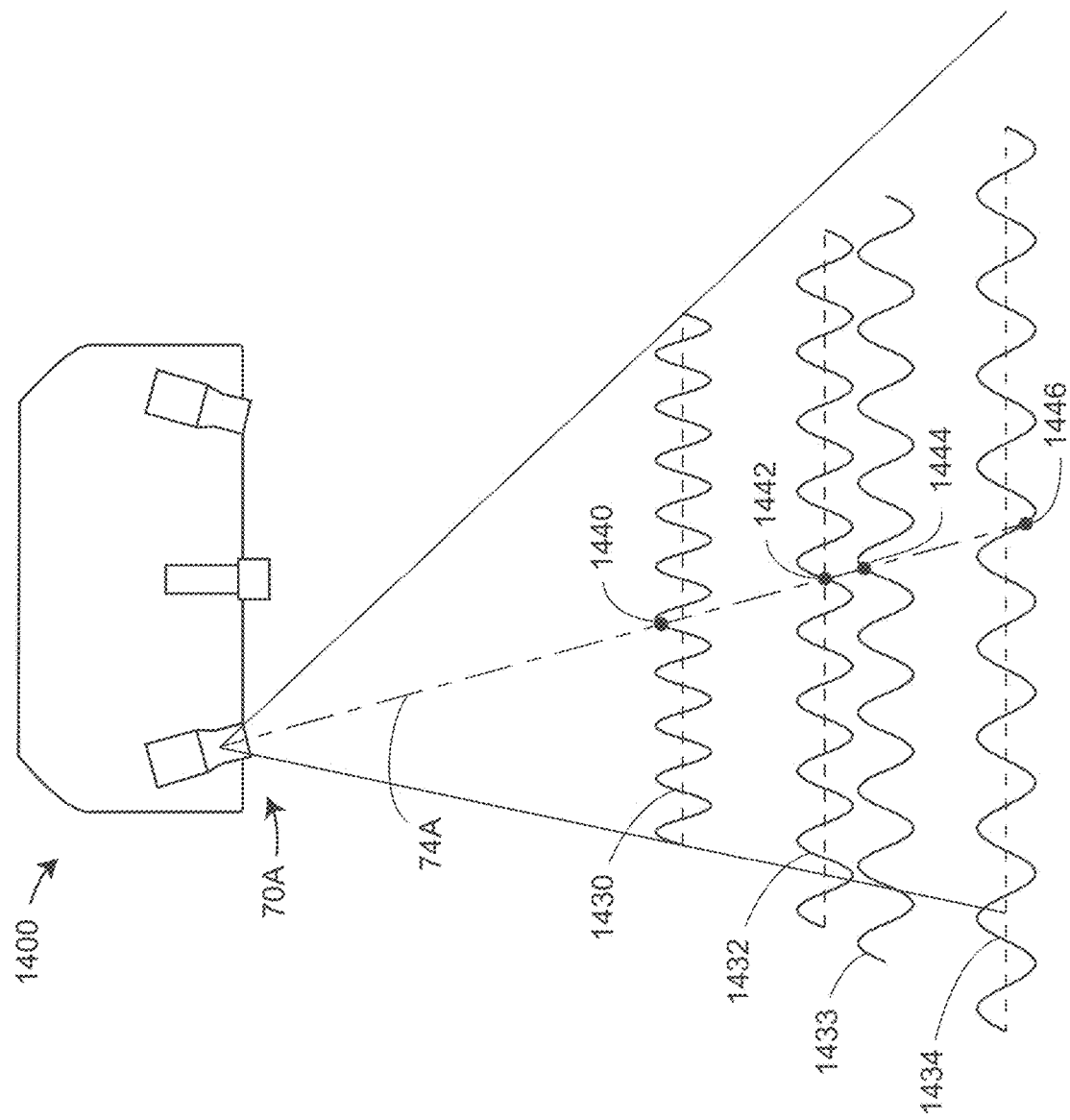

THREE-DIMIENSIONAL POINT CLOUD GENERATION USING MACHINE LEARNING

CROSS-REFERENCE TO RELATED APPLICATIONS

This application claims the benefit of U.S. Provisional Patent Application No. 63/165,399 filed Mar. 24, 2021, the disclosure of which is incorporated herein by reference in its entirety.

FIELD OF THE INVENTION

The subject matter disclosed herein relates in general to point cloud generation for a triangulation-type, three-dimensional (3D) imager device, also known as a triangulation scanner.

BACKGROUND OF THE INVENTION

A 3D imager uses a triangulation method to measure the 3D coordinates of points on an object. The 3D imager usually includes a projector that projects onto a surface of the object either a pattern of light (also referred to as a "light pattern") in a line or a pattern of light covering an area. A camera is coupled to the projector in a fixed relationship, for example, by attaching a camera and the projector to a common frame. The light emitted from the projector is reflected off of the object surface and detected by the camera. Since the camera and projector are arranged in a fixed relationship, the distance to the object may be determined using trigonometric principles. Compared to coordinate measurement devices that use tactile probes, triangulation systems provide advantages in quickly acquiring coordinate data over a large area. As used herein, the resulting collection of 3D coordinate values or data points of the object being measured by the triangulation system is referred to as point cloud data or simply a point cloud.

There are a number of areas in which existing triangulation scanners may be improved, including improved thermal stability and cooling, improved geometries for detecting problems or automatically correcting scanner compensation parameters, improved rejection of background lighting, reduced effect of cooling fan vibration, optimized illumination projection levels, improved ways to measure relatively large objects with relatively high accuracy and high resolution in a relatively short time, improved methods of registering an array of 3D imagers, and a structure configured to simplify proper alignment of 3D imagers to a part-under-test.

Accordingly, while existing triangulation-based 3D imager devices that use photogrammetry methods are suitable for their intended purpose, the need for improvement remains.

BRIEF DESCRIPTION OF THE INVENTION

According to one or more embodiments described herein, a method for training a machine learning model is provided. The method includes receiving training data collected by a three-dimensional (3D) imager, the training data comprising a plurality of training sets. The method further includes generating, using the training data, a machine learning model from which a disparity map can be inferred from a pair of images that capture a scene where a light pattern is projected onto an object.

In addition to one or more of the features described above, or as an alternative, each training set includes a left camera training image, a right camera training image, and a disparity training map.

In addition to one or more of the features described above, or as an alternative, the disparity map includes a ground truth disparity map and a visualized disparity map.

In addition to one or more of the features described above, or as an alternative, the machine learning model is based on a disparity neural network.

In addition to one or more of the features described above, or as an alternative, the machine learning model is based on a random forest algorithm.

In addition to one or more of the features described above, or as an alternative, further embodiments of the method include receiving a captured pair of images comprising a left camera image and a right camera image, the captured pair of images being captured by a second 3D imager using a light pattern projected onto the object, and generating, using the machine learning model, a disparity map for the captured pair of images.

In addition to one or more of the features described above, or as an alternative, the 3D imager includes. a projector, a first camera, and a second camera arranged in a predetermined geometric arrangement In addition to one or more of the features described above, or as an alternative, receiving the training data includes collecting the training data by: emitting with the projector the light pattern onto the object, the light pattern, and acquiring a first training image with the first camera and a second training image with the second camera.

According to one or more embodiments described herein, a system is provided. The system includes a first scanner having a first left camera, a first right camera, and a first projector. The first scanner captures a pair of training images by projecting a first light pattern onto a first object and capturing a first left image of the first object using the first left camera and a first right image of the first object using the first right camera. The system further includes a processing system to generate a machine learning model based at least in part on the first left image, the first right image, and a first disparity map calculated using the left image and the right image. The system further includes a second scanner having a second left camera, a second right camera, and a second projector. The second scanner captures a pair of images by projecting a second light pattern onto a second object and capturing a second left image of the second object using the second left camera and capturing a second right image of the second object using the second right camera. The second scanner generates, using the machine learning model, a second disparity map from the second left image and the second right image.

In addition to one or more of the features described above, or as an alternative, the machine learning model is based on a disparity neural network.

In addition to one or more of the features described above, or as an alternative, the machine learning model is based on a random forest algorithm.

According to one or more embodiments described herein, a method for performing inference using a machine learning model is provided. The method includes receiving a pair of images comprising a left camera image and a right camera image. The method further includes generating, using a machine learning model, a disparity map for the pair of images, the machine learning model being trained to create a point cloud from the pair of images that capture a scene where a light pattern is projected onto an object.

In addition to one or more of the features described above, or as an alternative, receiving the pair of images includes capturing, by a scanner, the pair of images.

In addition to one or more of the features described above, or as an alternative, the generating the disparity map is performed by the scanner.

In addition to one or more of the features described above, or as an alternative, further embodiments of the method include transmitting the pair of images to a processing system, wherein the generating the disparity map is performed by the scanner.

In addition to one or more of the features described above, or as an alternative, receiving the pair of images includes capturing, by a first scanner, the pair of images, wherein the generating the disparity map is performed by a second scanner.

In addition to one or more of the features described above, or as an alternative, receiving the pair of images includes capturing the pair of images by: emitting with a projector the light pattern onto the object, the light pattern having at least one element, and acquiring the left camera image with a first camera and a right camera image with a second camera of the at least one element.

In addition to one or more of the features described above, or as an alternative, further embodiments of the method include generating the point cloud from the disparity map for the pair of images.

In addition to one or more of the features described above, or as an alternative, generating the point cloud includes applying a triangulation technique to the disparity map to generate the point cloud In addition to one or more of the features described above, or as an alternative, the triangulation technique utilizes a stereo calibration technique to generate the point cloud.

In addition to one or more of the features described above, or as an alternative, the machine learning model is based on a disparity neural network.

In addition to one or more of the features described above, or as an alternative, the machine learning model is based on a random forest algorithm.

These and other advantages and features will become more apparent from the following description taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIGS. 13D and 13E are schematic representations of ray models used for the camera and projector lenses;

FIG. 14C illustrates projection of a finer sine-wave pattern according to one or more embodiments described herein;

FIG. 14D illustrates reception of the finer sine-wave pattern according to one or more embodiments described herein;

The detailed description explains embodiments of the invention, together with advantages and features, by way of example with reference to the drawings.

DETAILED DESCRIPTION OF THE INVENTION

Embodiments of the present invention provide advantages in improving point cloud generation using 3D imagers (i.e., triangulation scanners).

Particularly, embodiments described herein provide a machine learning-based technique to obtain a dense (e.g., one 3D point per camera pixel that frames an area that is also seen by another camera), high accuracy point cloud from a pair of images that capture a scene where a light pattern (e.g., a structured light pattern, a pseudorandom pattern, etc.). is projected onto an object. The present techniques provides for training a machine learning model and for implementing the machine learning model to perform inference. As an example, the machine learning model is trained to take as input a single image (or image pair) of an object and provide as output a disparity map that is used to compute 3D point coordinates associated with the object.

Figure 1:
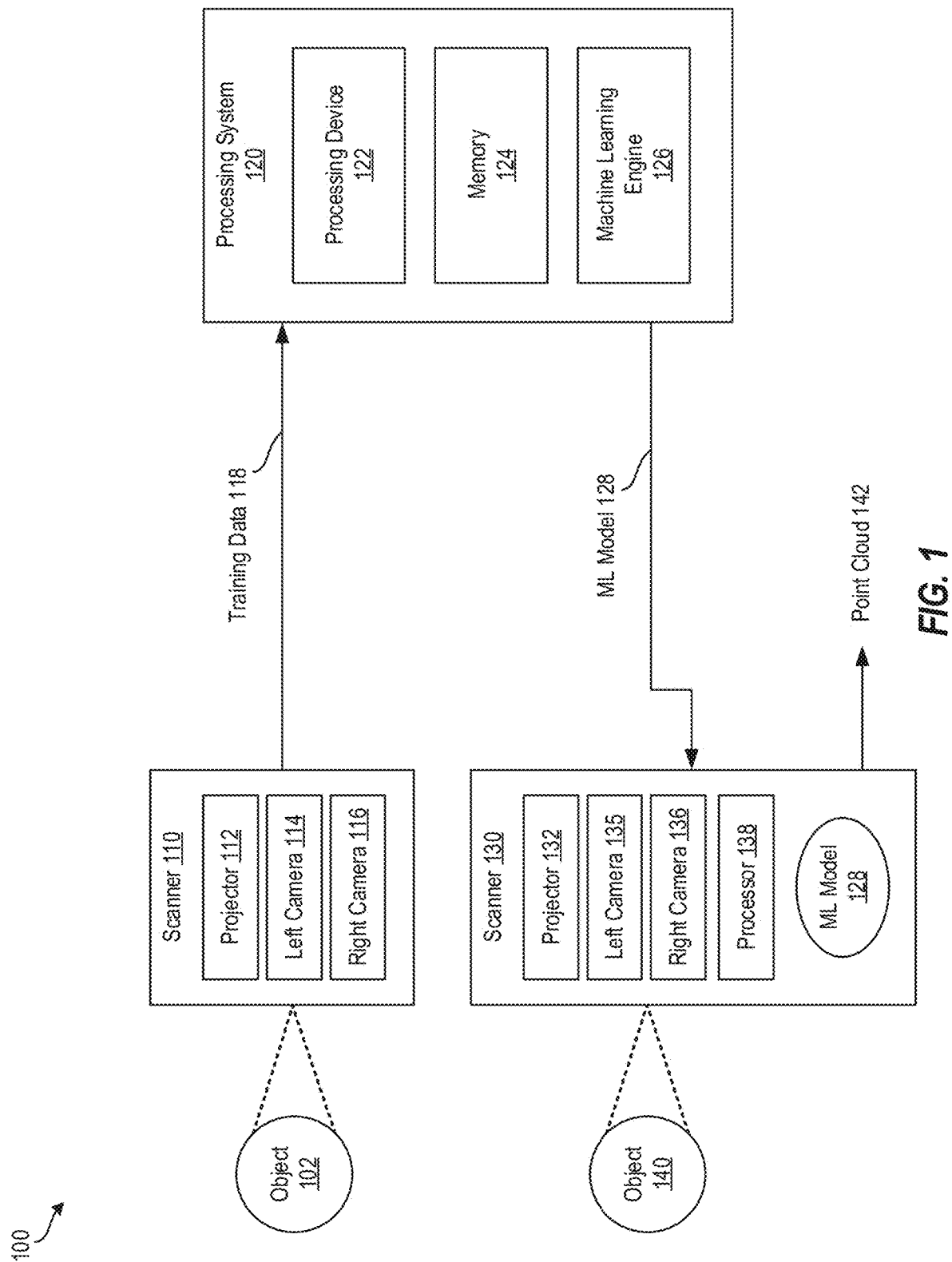
FIG. 1 illustrates a system for 3D point cloud generation using machine learning according to one or more embodiments described herein.

FIG. 1 illustrates a system 100 for 3D point cloud generation using machine learning according to one or more embodiments described herein. The system 100 includes a scanner 110, a processing system 120, and a scanner 130. The system 100 uses the scanner 110 to collect training data 118, uses the processing system 120 to train a machine learning model 128 from the training data 118, and uses the scanner 130 to scan an object, and generate 3D coordinates 142 for an object 140 using the machine learning model 128.

The scanner 110 scans an object 102 to capture images of the object 102 used for training a machine learning model 128. The scanner 110 can be any suitable scanner, such as the 3D imager 10 shown in FIGS. 2A and 2B, that includes a projector and cameras. For example, the scanner 110 includes a projector 112 that projects a light pattern on the object 102. The light pattern can be any suitable pattern, such as those described herein, and can include a structured-light pattern, a pseudorandom pattern, etc. See, for example, the discussion of FIG. 10, which describes projecting a pattern of light over an area on a surface, such as a surface of the object 102. The scanner 110 also includes a left camera 114 and a right camera 116 (collectively referred to herein as "cameras 114, 116") to capture stereoscopic views, e.g., "left eye" and "right eye" views, of the object 102. The cameras 114, 116 are spaced apart such that images captured by the respective cameras 114, 116 depict the object 102 from different points-of-view. See, for example, the discussion of FIG. 10, which describes capturing images of the pattern of light (projected by the projector) on the surface, such as the surface of the object 102. According to one or more embodiments described herein, the cameras 114, 116 capture images of the object 102 having the light pattern projected thereon at substantially the same time. For example, at a particular point in time, the left camera 114 and the right camera 116 each capture an image of the object 102. Together, these two images are referred to as an image pair or frame. The cameras 114, 116 can capture multiple image pairs of the object 102. Once the cameras 114, 116 capture the image pairs of the object 102, the image pairs are sent to the processing system 120 as training data 118.

The processing system 120 receives the training data 118 (e.g., image pairs and a disparity map for each set of image pairs) from the scanner 110 via any suitable wired and/or wireless communication technique directly and/or indirectly (such as via a network). According to one or more embodiments described herein, processing system 120 receives training images from the scanner 110 and computes a disparity map for each set of the training images. The disparity map encodes the difference in pixels for each point seen by both the left camera 114 and the right camera 116 viewpoints. In other examples, the scanner 110 computes the disparity map for each set of training images and transmits the disparity map as part of the training data 118 to the processing system 120. According to one or more embodiments described herein, the disparity map is the input of the training data.

The processing system 120 includes a processing device 122, a memory 124, and a machine learning engine 126. The various components, modules, engines, etc. described regarding the processing system 120 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the machine learning engine 126 can be a combination of hardware and programming or be a codebase on a computing node of a cloud computing environment. The programming can be processor executable instructions stored on a tangible memory, and the hardware can include the processing device 122 for executing those instructions. Thus a system memory (e.g., memory 124) can store program instructions that when executed by the processing device 122 implement the machine learning engine 126. Other engines can also be utilized to include other features and functionality described in other examples herein.

The machine learning engine 126 generates a machine learning (ML) model 128 using the training data 118.

According to one or more embodiments described herein, training the machine learning model 128 is a fully automated process that uses machine learning to take as input a single image (or image pair) of an object and provided as output a disparity map that is used to compute 3D coordinates 142 associated with the object seen in the images.

As described herein, a neural network can be trained to generate a disparity map, which is useful computing 3D coordinates 142 associated with an object being scanned, for example. More specifically, the present techniques can incorporate and utilize rule-based decision making and artificial intelligence (AI) reasoning to accomplish the various operations described herein, namely generating a disparity map from scanned images from triangulation scanners, for example. The phrase "machine learning" broadly describes a function of electronic systems that learn from data. A machine learning system, module, or engine (e.g., the machine learning engine 126) can include a trainable machine learning algorithm that can be trained, such as in an external cloud environment, to learn functional relationships between inputs and outputs that are currently unknown, and the resulting model can be used for generating disparity maps.

In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANN that are particularly useful at analyzing visual imagery.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read. It should be appreciated that these same techniques can be applied in the case of generating disparity maps as described herein.

The machine learning engine 126 can generate the machine learning model 128 using one or more different techniques. As one example as shown in at least FIG. 18, the machine learning engine 126 generates the machine learning model 128 using a neural network approach (e.g., disparity neural network). As another example as shown in at least FIG. 19, the machine learning engine 126 generates the machine learning model 128 using a random forest architecture approach.

Once trained, the machine learning model 128 is passed to the scanner 130, which enables the scanner 130 to use the machine learning model 128 during an inference process. The scanner 130 can be the same scanner as the scanner 110 in some examples or can be a different scanner in other examples. In the case the scanners 110, 130 are different scanners, the scanners 110, 130 can be the same type/configuration of scanner or the scanner 130 can be a different type/configurations of scanner than the scanner 110. In the example of FIG. 1, the scanner 130 includes a projector 132 to project a light pattern on the object 140. The scanner 130 also includes a left camera 135 and a right camera 136 to capture images of the object 140 having the light pattern projected thereon. The scanner 130 also includes a processor 138 that processes the images using the machine learning model 128 to take as input a single image (or image pair) of the object 140 from the left camera 135 and the right camera 136 and provided as output a disparity map that is used to compute 3D coordinates 142 associated with the object.

Figure 2A:
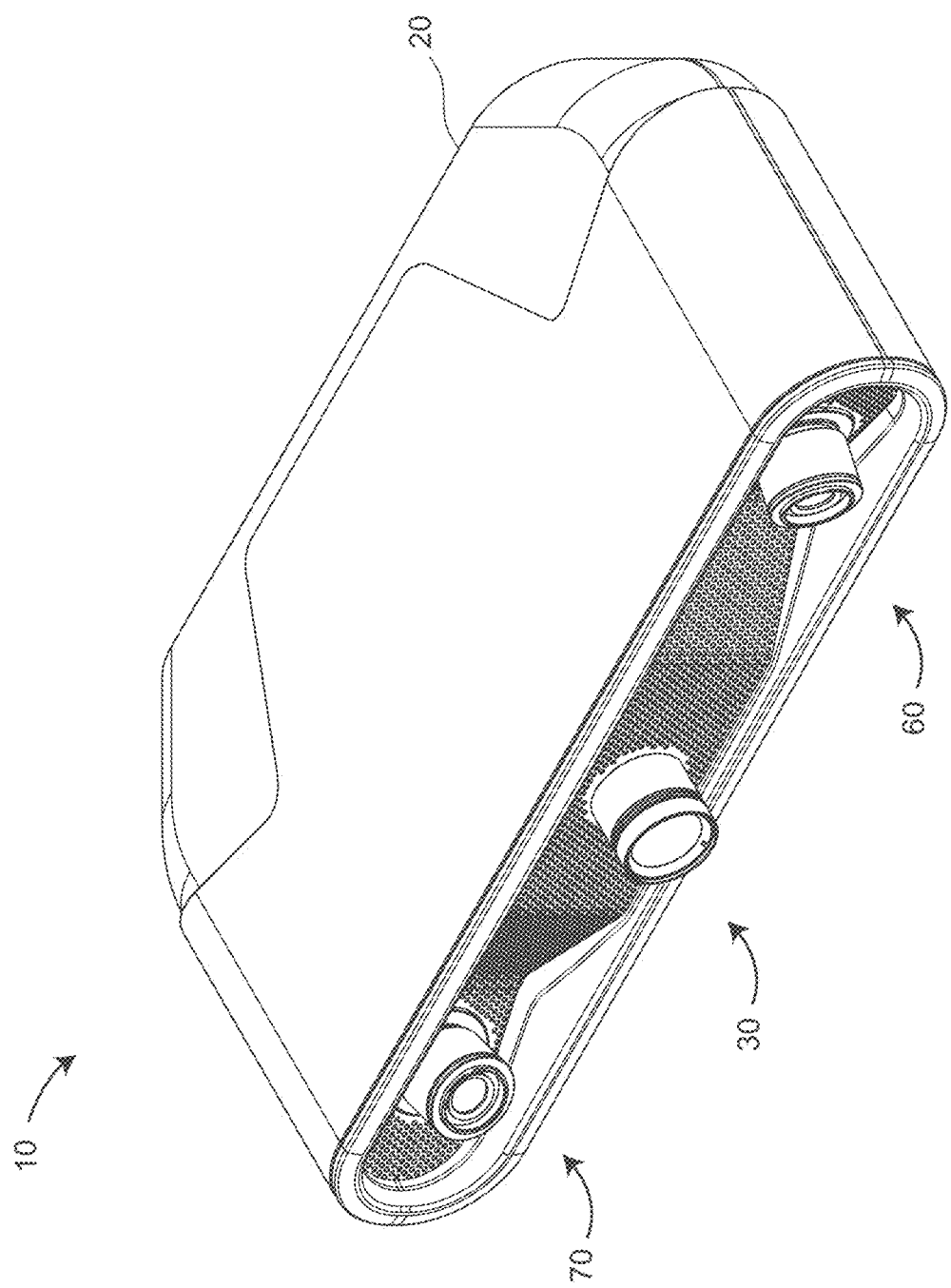
FIG. 2A is a perspective view of a 3D imager according to one or more embodiments described herein.

Examples of scanners (or 3D imagers) are now described in more detail with reference to FIGS. 2-15. Particularly, FIG. 2A depicts a perspective view of a 3D imager 10 (also referred to as a scanner, such as the scanner 110 and/or the scanner 130 of FIG. 1) according to one or more embodiments described herein. It includes a frame 20, a projector 30, a first camera assembly 60, and a second camera assembly 70.

Figure 2B:
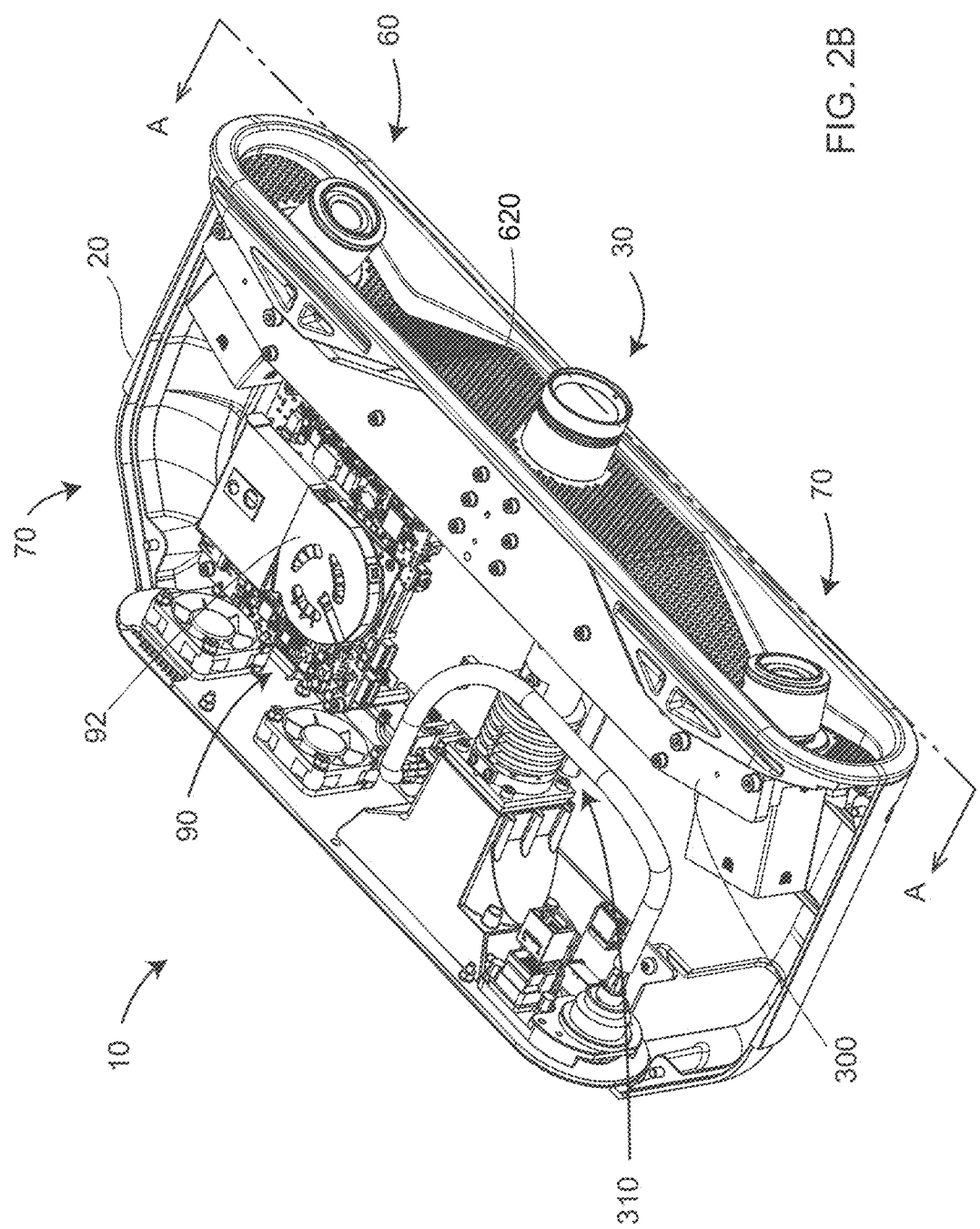
FIG. 2B is a perspective view of internal elements of a 3D imager having its cover removed according to one or more embodiments described herein.
Figure 3:
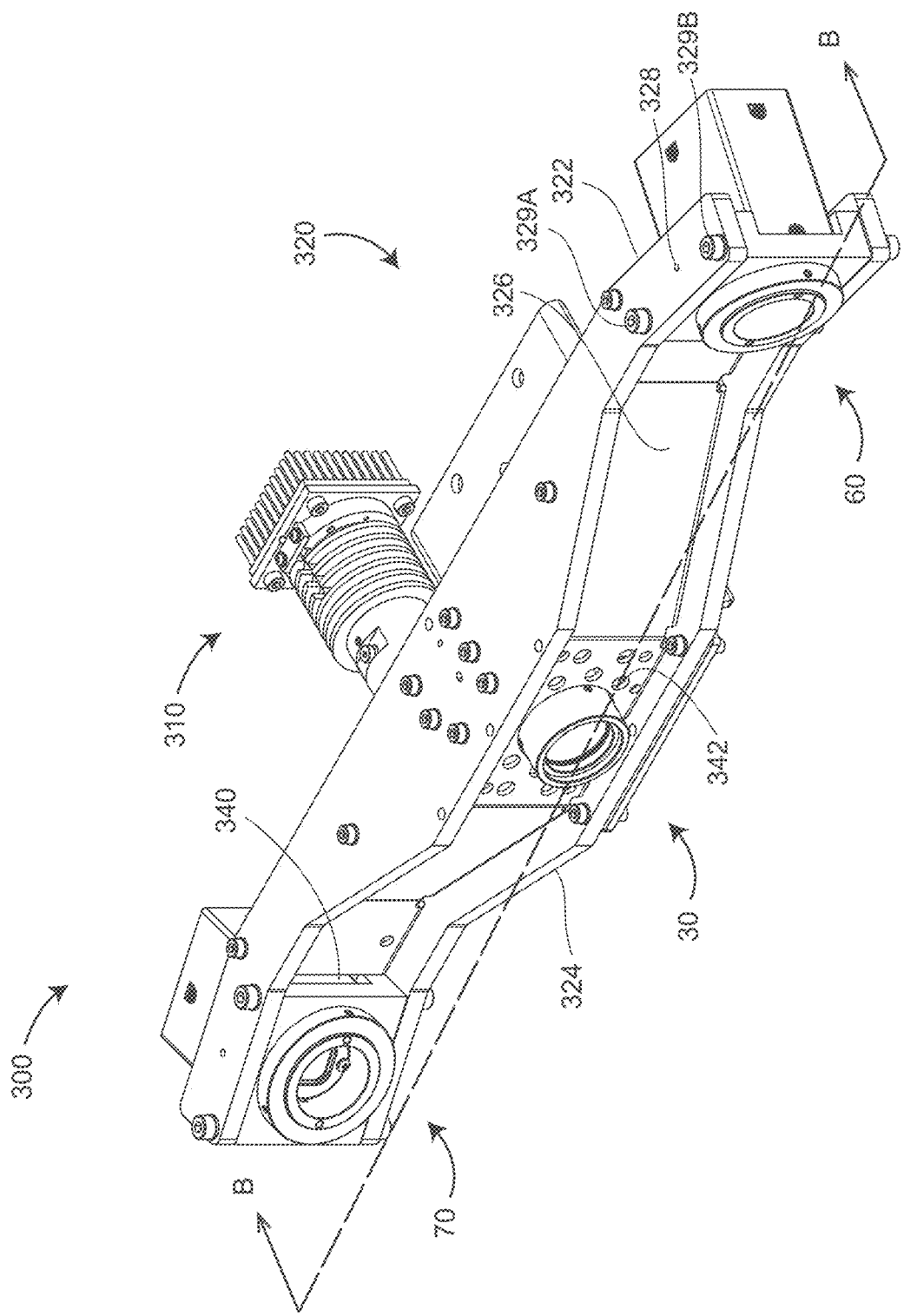
FIG. 3 is a perspective view of a projector-camera assembly of a 3D imager according to one or more embodiments described herein.

FIG. 2B and FIG. 3 show perspective views of internal elements 70 of the 3D imager 10. Internal elements are enclosed in a lower frame element 20. FIG. 3 shows elements of a projector-camera assembly 300 that includes projector-source assembly 310, projector 30, first camera-lens assembly 60, second camera-lens assembly 70, and support assembly 320. The support assembly 320 includes top structural support 322, bottom structural support 324, and web support 326. In addition, each camera includes mounting pins 328 and screws 329A, 329B.

Figure 4:
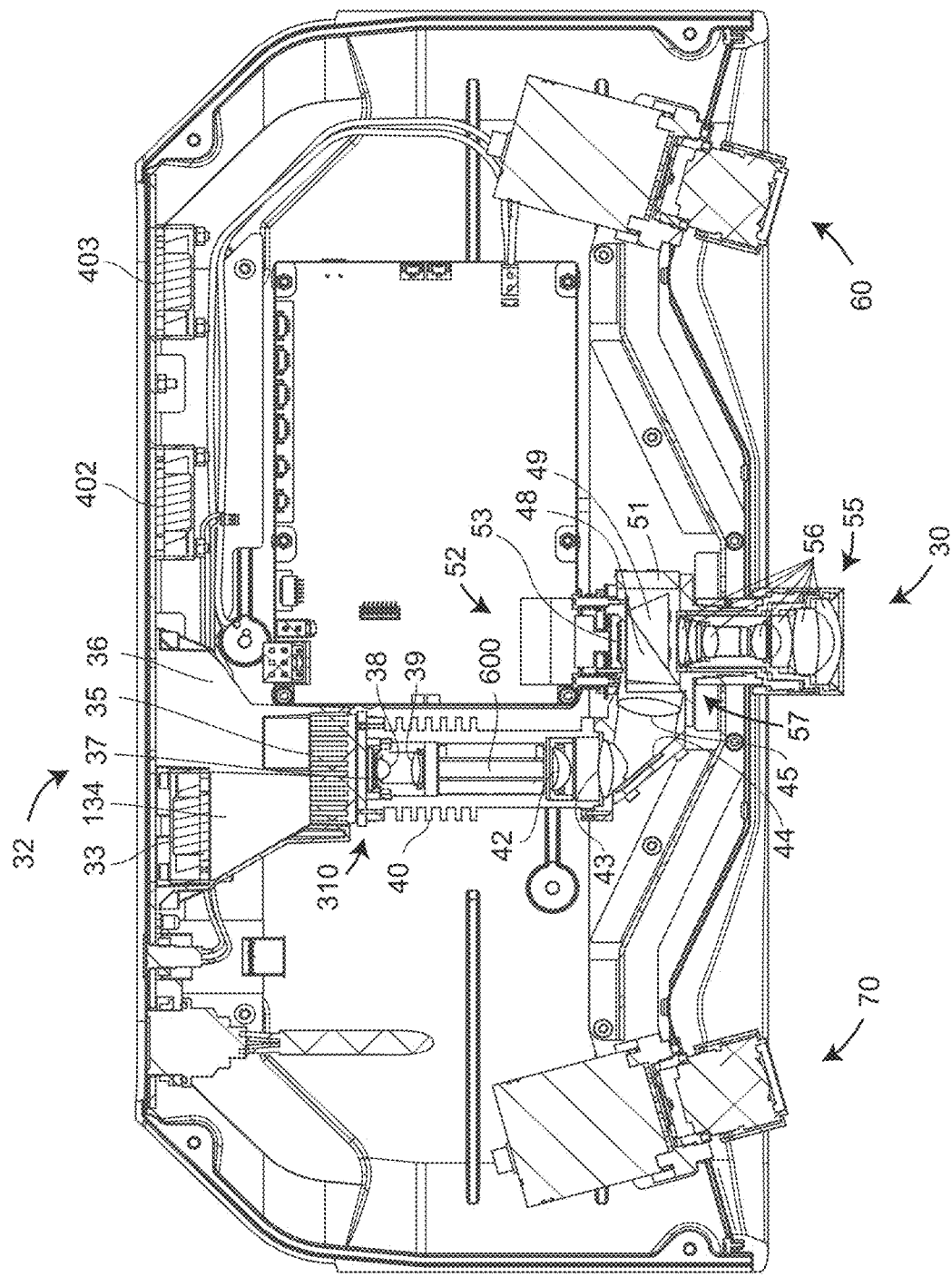
FIG. 4 is a top view of internal elements of a 3D imager having its cover removed according to one or more embodiments described herein.

FIG. 4 is a top cross-sectional view of the 3D imager from FIG. 2B. The projector lens assembly 30 includes a projector lens 55 and a projector lens mount 57. Projector lens 55 includes projector lens elements 56.

Figure 5A:
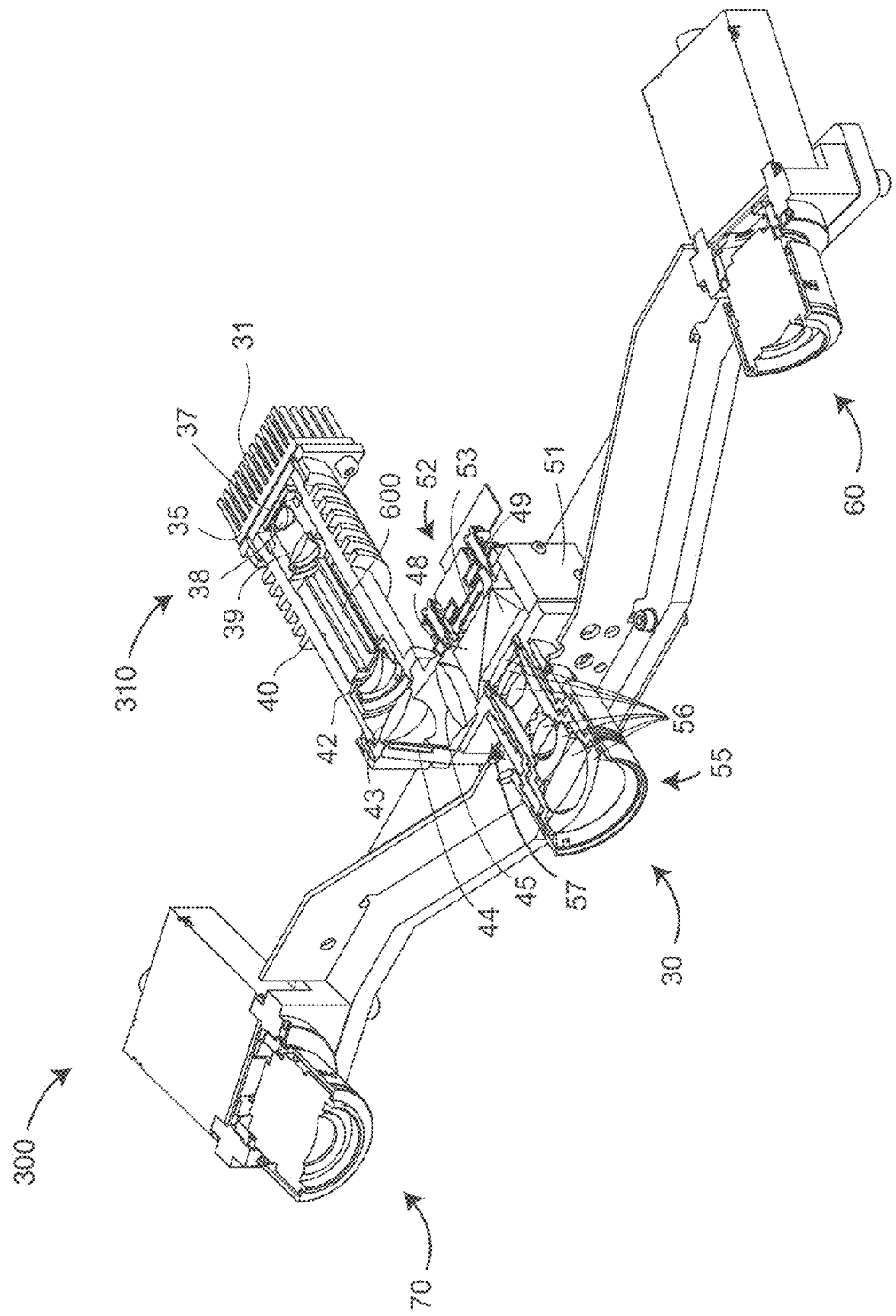
FIG. 5A is a cross sectional view of the projector-camera assembly according to one or more embodiments described herein.
Figure 5B:
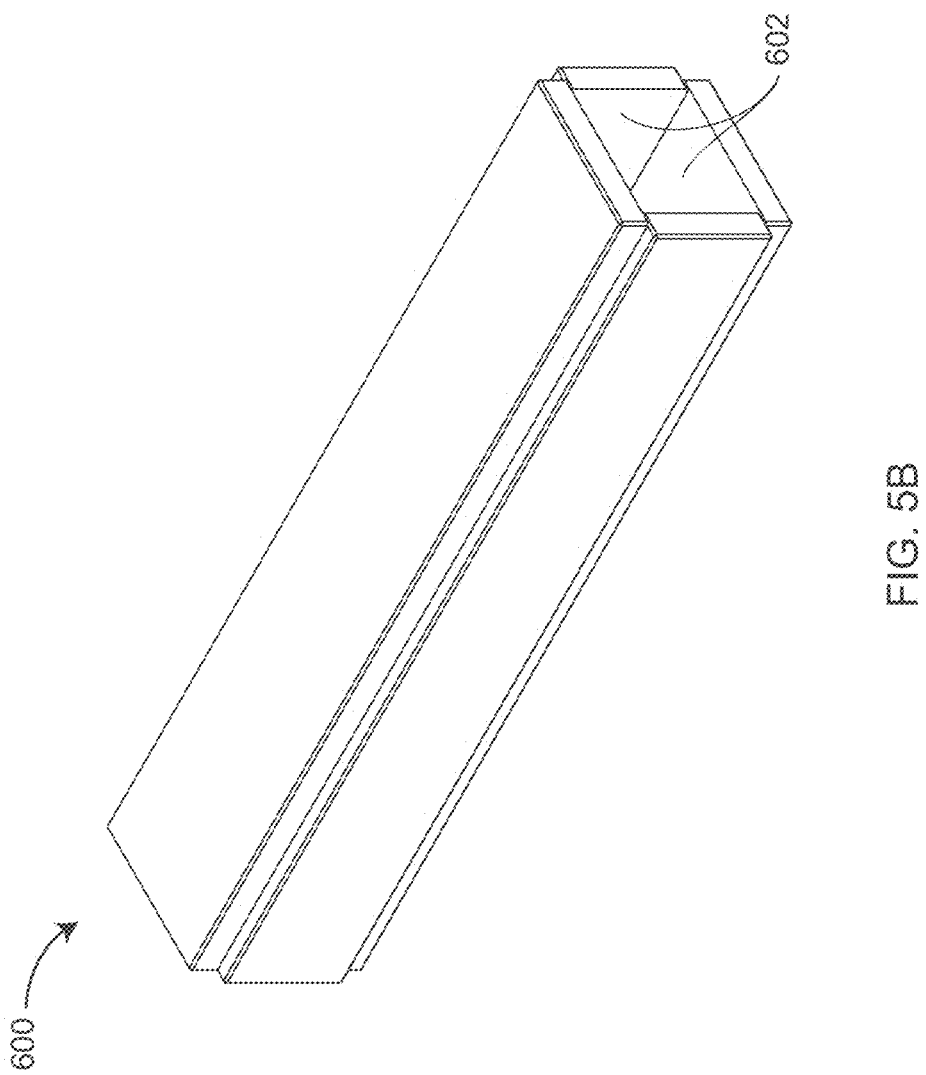
FIG. 5B is a perspective view of a light pipe according to one or more embodiments described herein.

FIG. 5A, which is a cross-sectional view from FIG. 3, shows additional details of projector-source assembly 310 and pattern-projection assembly 52. In an embodiment, the projector-source assembly 310 includes light source 37, condensing lens elements 38, 39, light pipe 600, lenses 42, 43, 44, and mirror 44. In an embodiment, the light source 37 is an LED. The condensing lenses 38, 39 funnel light into the light pipe 600, which is shown in more detail in FIG. 5B. The light type reflects rays of light off reflective surfaces 602 in the light pipe 600. The purpose of the light pipe is to improve the homogeneity of the light from the condenser lenses 38, 39. Light passes through lenses 42 and 43 before reflecting off mirror 44 and passing through lens 45 into the pattern-projection assembly 52.

The pattern-projection assembly 52 includes a first prism 48, a second prism 49, and a digital micromirror device (DMD) 53. Together, the first prism 48 and second prism 49 comprise a total-internal-reflection (TIR) beam combiner. Light from lens 45 strikes an air interface between the first prism 48 and second prism 49. Because of the index of refraction of the glass in the first prism 48 and the angle of the first air interface relative to the light arriving from the lens 45, the light totally reflects toward the DMD 53. In the reverse direction, light reflected off the DMD 53 does not experience TIR and passes either out of the projector lens assembly 30 or onto a beam block 51. In an embodiment, the DMD 53 includes a large number of small micromechanical mirrors that rotate by a small angle of 10 to 12 degrees in either of two directions. In one direction, the light passes out of the projector 30. In the other direction, the light passes onto the beam block 51. Each mirror is toggled very quickly in such a way as to enable reflection of many shades of gray, from white to black. In an embodiment, the DMD chip produces 1024 shades of gray.

Figure 6B:
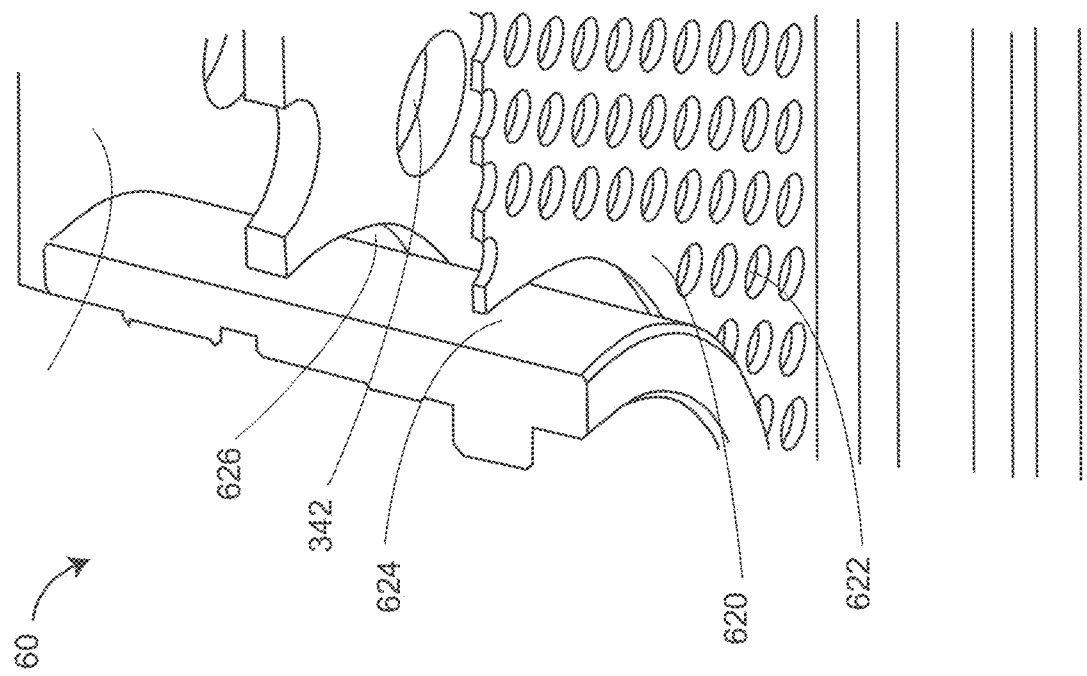
FIG. 6B is a partial perspective view of cooling vents surrounding a camera lens assembly according to one or more embodiments described herein.
Figure 6A:
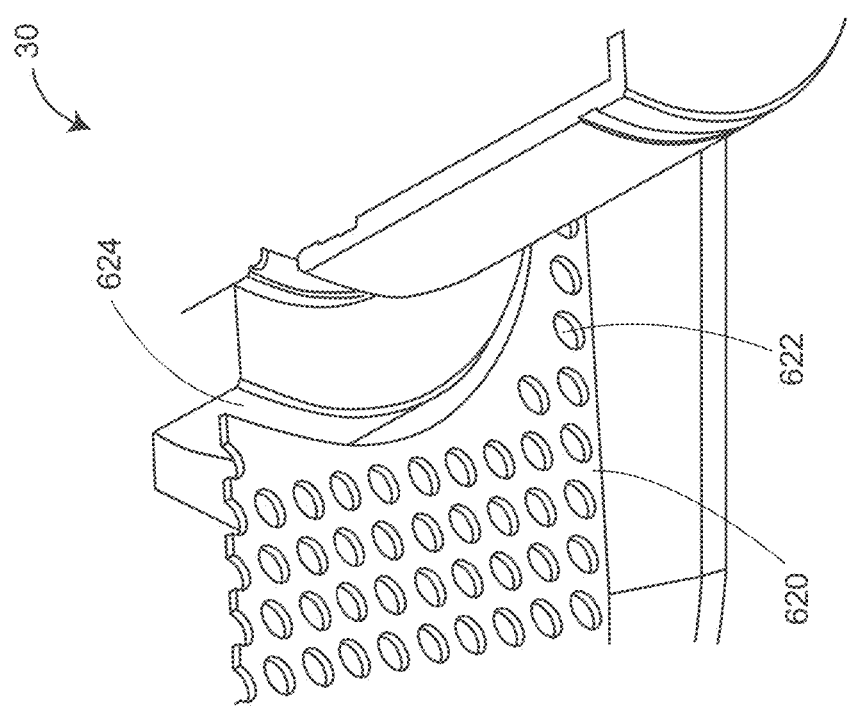
FIG. 6A is a partial perspective view of cooling vents surrounding a projector lens assembly according to one or more embodiments described herein.
Figure 6C:
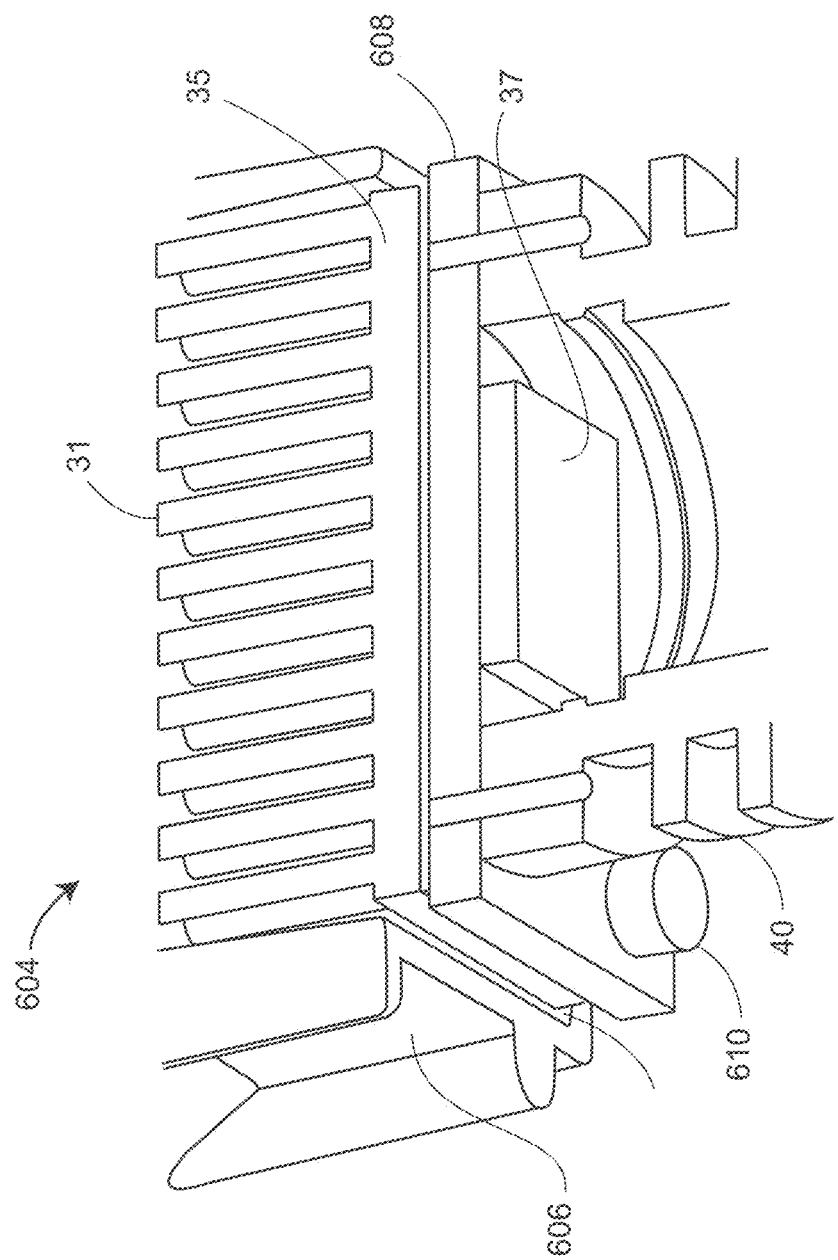
FIG. 6C is a partial perspective view of projector source cooling elements according to one or more embodiments described herein.

The light source assembly 37 is cooled by projector cooling system 32 shown in FIG. 4. The projector cooling system 32 includes fan 33, chambers 134, 36, and heat sinks 35, 40. In an embodiment, the heat sink 35 includes projections 31 having intervening air spaces, as shown in FIGS. 5A and 6C. In an embodiment, the fan 33 pushes air through chamber 134, through the air spaces separating the projections 31, into the chamber 36, and out the 3D imager 10 through a filtered exit in the frame 20. In this way, relatively cool outside air is forced past the heat sink projections 31, thereby removing heat generated by the light source 37 and stabilizing the temperature of the light source 37. In an embodiment illustrated in partial perspective view 604 in FIG. 6C, the light source 37 is an LED chip mounted to a heat sink element 608 that is in contact with the heat sink 31 and heat sink 40. The heat sink 31 may be in contact with a surrounding heat sink 606. In an embodiment, a temperature sensor 610 is attached to the heat sink element 608 to enable monitoring of the LED temperature.

Elements within the frame 20 are cooled by fans 402 and 403 shown in FIG. 4. The fans 402 and 403 pull air out of the cavity, first through holes 622 and openings 624 in a grill vent 620 surrounding the projector 30, the first camera assembly 60, and the second camera assembly 70. The air is pulled through additional openings and holes in the projector-camera assembly 300 such as the opening 340 and the web holes 342 shown in FIG. 3 and the opening 626 shown in FIG. 6B. The air drawn out of the frame 20 by the fans 402 and 403 provides cooling for the projector 30 and the camera assemblies 60, 70, as well as the heat sink 40 and other elements internal to the frame 20. As shown in FIG. 2B, in an embodiment further cooling is provided for a circuit board 90 by a fan 92 that pumps heat from the circuit board out of the frame 20 through a dedicated duct.

Figure 7:
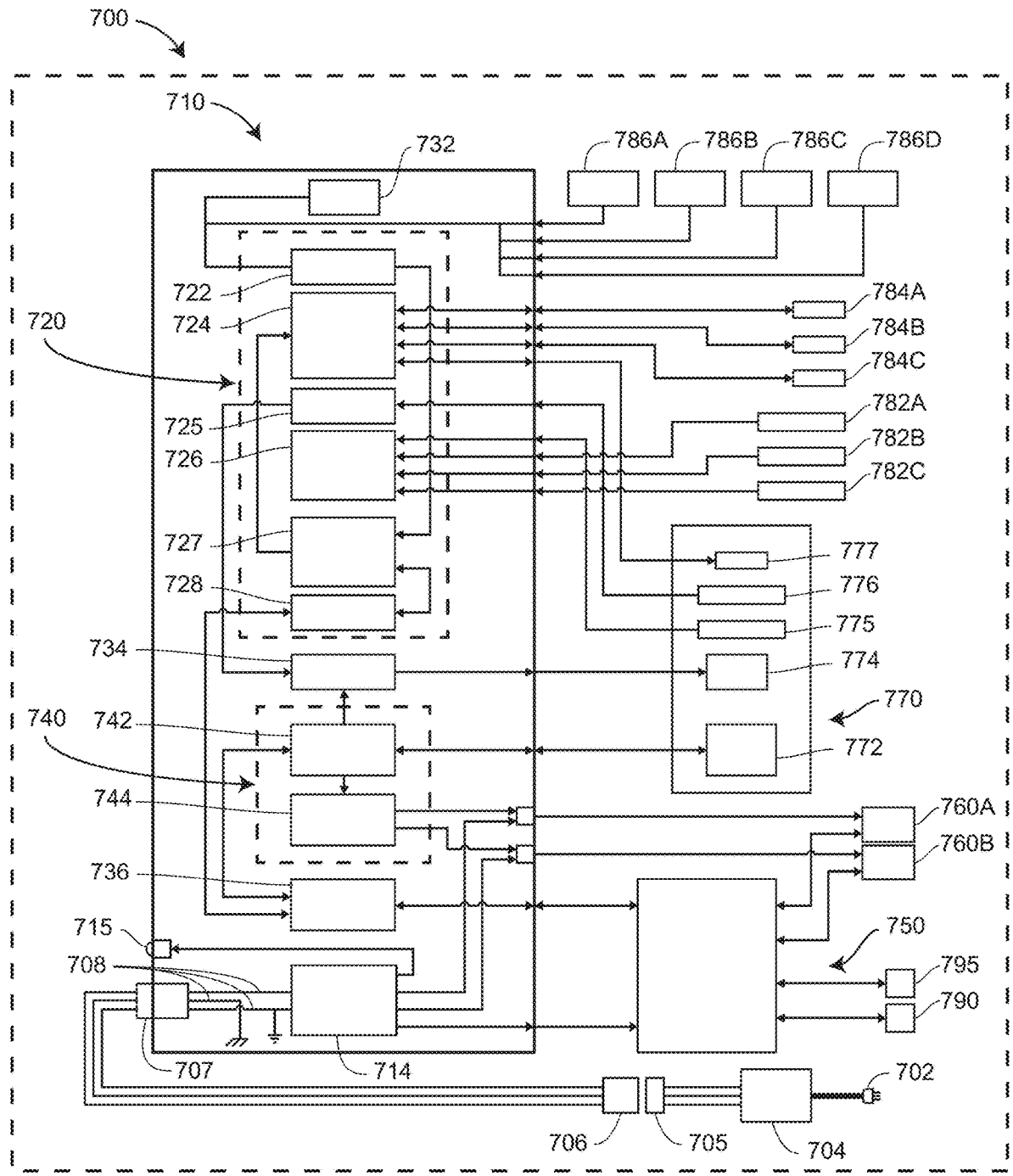
FIG. 7 is a block diagram of electrical components of a 3D imager according to one or more embodiments described herein.

In an embodiment, the 3D imager includes internal electrical system 700 shown in FIG. 7. Internal electrical system 700 includes a Peripheral Component Interface (PCI) board 710, projector electronics 770, a processor board 750, and a collection of additional components discussed herein below. In an embodiment, the PCI board 710 includes a microcontroller integrated circuit 720, DMD controller chip 740, LED driver chip 734, an inertial measurement unit (IMU) chip 732, a Universal Serial Bus (USB) hub 736, and a power conversion component 714.

In an embodiment, the microcontroller integrated circuit 720 is a Programmable System-on-Chip (PSoC) by Cypress Semiconductor. The PSoC includes a central processing unit (CPU) core and mixed-signal arrays of configurable integrated analog and digital peripheral functions. In an embodiment, the microcontroller integrated circuit 720 is configured to serve as (1) a controller 724 for the fans 784A, 784B, and 784C, corresponding to fans 33, 402, and 403 in FIG. 4; (2) a controller for the LED driver chip 736; (3) an interface 726 for thermistor temperature sensors 782A, 782B, and 782C; (4) an inter-integrated circuit (I2C) interface 722; (5) an ARM microcontroller 727; and (6) a USB interface 728. The I2C interface 722 receives signals from the IMU chip 732 and I2C temperature sensors 786A, 786B, 786C, and 786D. It sends signals to an ARM microcontroller 727, which in turn sends signals to the fan controller 724. The DMD controller chip 740 sends high speed electrical pattern sequences to a DMD chip 772. It also sends output trigger signals to electronics 760A and 760B of the first camera assembly 60 and the second camera assembly 70, respectively. In an embodiment, the IMU includes a three-axis accelerometer and a three-axis gyroscope. In other embodiments, the IMU further includes an attitude sensor such as a magnetometer and an altitude sensor such as a barometer.

The projector electronics 770 includes fan electronics 777, projector photodiode 776, projector thermistor electronics 775, light source electronics 774, and DMD chip 772. In an embodiment, fan electronics 777 provides an electrical signal to influence the speed of the projector fan 33. The projector photodiode 776 measures an amount of optical power received by the DMD chip 772. The projector thermistor electronics 775 receives a signal from a thermistor temperature sensor such as the sensor 610 in FIG. 6C. The sensor 610 may provide a control signal in response. The light source electronics 774 may drive an LED chip 37. In an embodiment, the DMD is a DLP4500 device from Texas Instruments. This device includes 912×1140 micromirrors.

In an embodiment, the processor board 750 is a Next Unit of Computing (NUC) small form factor PC by Intel. In an embodiment, the processor board 750 is on the circuit board 90, which includes an integrated fan header 92, as shown in FIG. 2A. In an embodiment, the processor board 750 communicates with camera assemblies 60 and 70 over electronics 760A, 760B via USB 3.0. The processor board 750 performs phase and triangulation calculations as discussed herein below and sends the results over USB 3.0 to the USB 2.0 hub 736, which shares signals with the DMD controller chip 740 and the USB interface 728. The processor board 750 may perform additional functions such as filtering of data or it may send partly processed data to additional computing elements, as explained herein below with reference to FIG. 8. In an embodiment, the processor board 750 further includes a USB 3.0 jack and an RJ45 jack.

In an embodiment, a DC adapter 704 attached to an AC mains plug 702 provides DC power through a connector pair 705, 706 and a socket 707 to the 3D imager 10. Power enters the frame 20 over the wires 708 and arrives at the power conversion component 714, which down-converts the DC voltages to desired levels and distributes the electrical power to components in the internal electrical system 700. One or more LEDs 715 may be provided to indicate status of the 3D imager 10.

Figure 8:
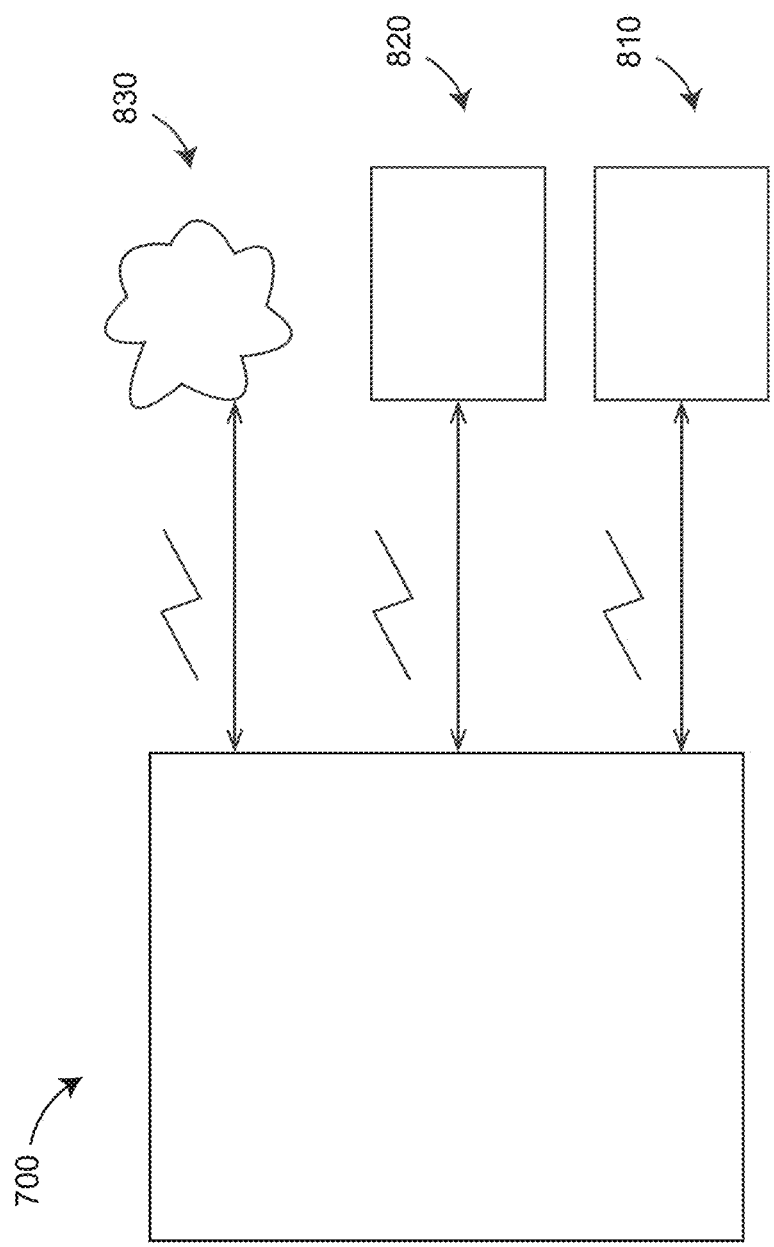
FIG. 8 is a block diagram of a processor system according to one or more embodiments described herein.

FIG. 8 is a block diagram of a computing system that includes the internal electrical system 700, one or more computing elements 810, 820, and a network of computing elements 830, commonly referred to as the cloud. The cloud may represent any sort of network connection (e.g., the worldwide web or internet). Communication among the computing (processing and memory) components may be wired or wireless. Examples of wireless communication methods include IEEE 802.11 (Wi-Fi), IEEE 802.15.1 (Bluetooth), and cellular communication (e.g., 3G and 4G). Many other types of wireless communication are possible. A popular type of wired communication is IEEE 802.3 (Ethernet). In some cases, multiple external processors, especially processors on the cloud, may be used to process scanned data in parallel, thereby providing faster results, especially where relatively time-consuming registration and filtering may be required.

Figure 9:
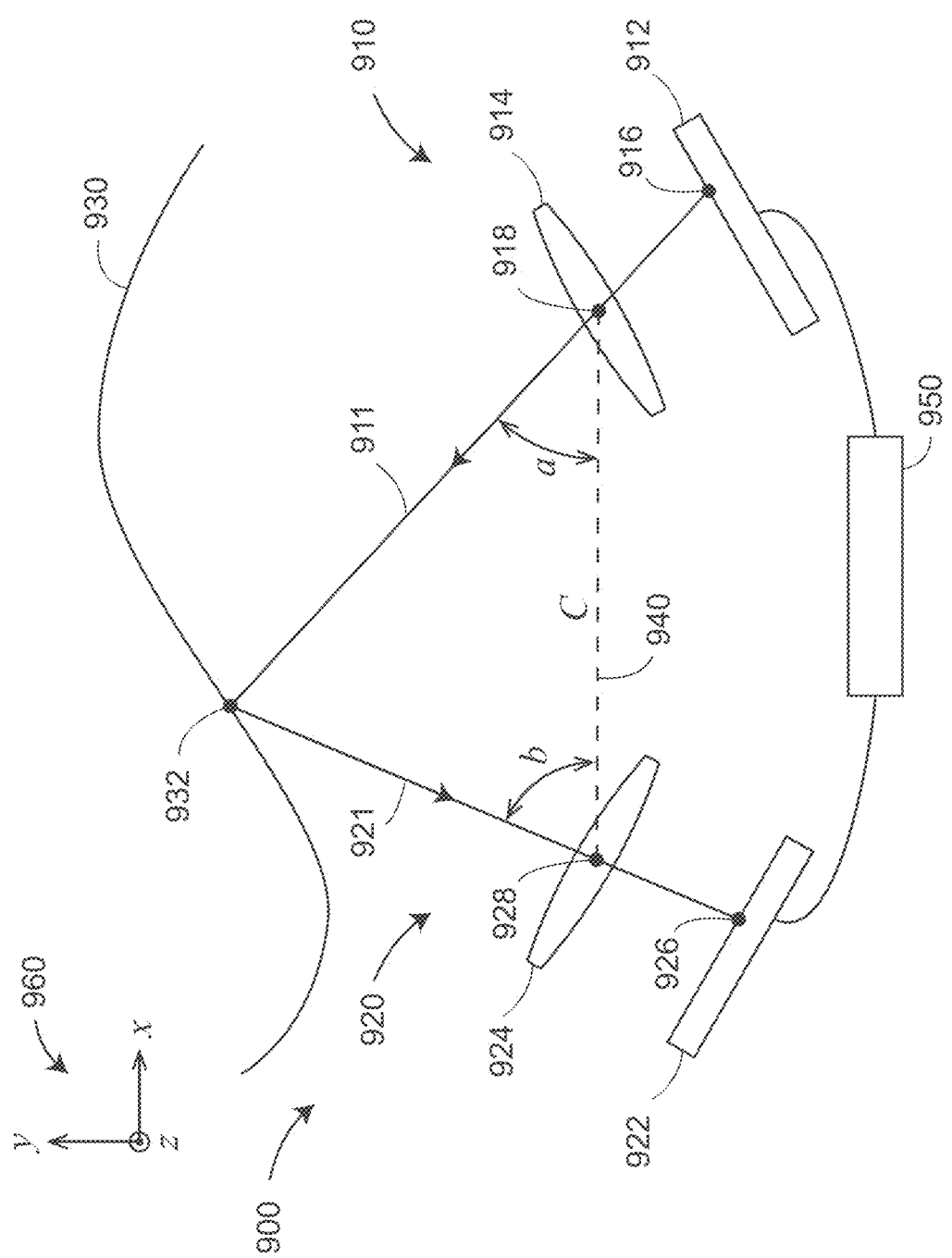
FIG. 9 is a schematic illustration of the principle of operation of a triangulation scanner having a camera and a projector according to one or more embodiments described herein.

FIG. 9 shows a structured light triangulation scanner (i.e., 3D imager) 900 that projects a pattern of light over an area on a surface 930. The scanner, which has a frame of reference 960, includes a projector 910 and a camera 920.

The projector 910 includes an illuminated projector pattern generator 912, a projector lens 914, and a perspective center 918 through which a ray of light 911 emerges. The ray of light 911 emerges from a corrected point 916 having a corrected position on the pattern generator 912. In an embodiment, the point 916 has been corrected to account for aberrations of the projector, including aberrations of the lens 914, in order to cause the ray to pass through the perspective center, thereby simplifying triangulation calculations.

The ray of light 911 intersects the surface 930 in a point 932, which is reflected (scattered) off the surface and sent through the camera lens 924 to create a clear image of the pattern on the surface 930 on the surface of a photosensitive array 922. The light from the point 932 passes in a ray 921 through the camera perspective center 928 to form an image spot at the corrected point 926. The image spot is corrected in position to correct for aberrations in the camera lens. A correspondence is obtained between the point 926 on the photosensitive array 922 and the point 916 on the illuminated projector pattern generator 912. As explained herein below, the correspondence may be obtained by using a coded or an uncoded (sequentially projected) pattern. Once the correspondence is known, the angles a and b in FIG. 9 may be determined. The baseline 940, which is a line segment drawn between the perspective centers 918 and 928, has a length C. Knowing the angles a, b and the length C, all the angles and side lengths of the triangle 928-932-918 may be determined. Digital image information is transmitted to a processor 950, which determines 3D coordinates of the surface 930. The processor 950 may also instruct the illuminated pattern generator 912 to generate an appropriate pattern. The processor 950 may be located within the scanner assembly, or it may be an external computer, or a remote server.

As used herein, the term "pose" refers to a combination of a position and an orientation. In embodiment, the position and the orientation are desired for the camera and the projector in a frame of reference of the 3D imager 900. Since a position is characterized by three translational degrees of freedom (such as x, y, z) and an orientation is composed of three orientational degrees of freedom (such as roll, pitch, and yaw angles), the term pose defines a total of six degrees of freedom. In a triangulation calculation, a relative pose of the camera and the projector are desired within the frame of reference of the 3D imager. As used herein, the term "relative pose" is used because the perspective center of the camera or the projector can be located on an (arbitrary) origin of the 3D imager system; one direction (say the x axis) can be selected along the baseline; and one direction can be selected perpendicular to the baseline and perpendicular to an optical axis. In most cases, a relative pose described by six degrees of freedom is sufficient to perform the triangulation calculation. For example, the origin of a 3D imager can be placed at the perspective center of the camera. The baseline (between the camera perspective center and the projector perspective center) may be selected to coincide with the x axis of the 3D imager. The y axis may be selected perpendicular to the baseline and the optical axis of the camera. Two additional angles of rotation are used to fully define the orientation of the camera system. Three additional angles or rotation are used to fully define the orientation of the projector. In this embodiment, six degrees-of-freedom define the state of the 3D imager: one baseline, two camera angles, and three projector angles. In other embodiment, other coordinate representations are possible.

Figure 10:
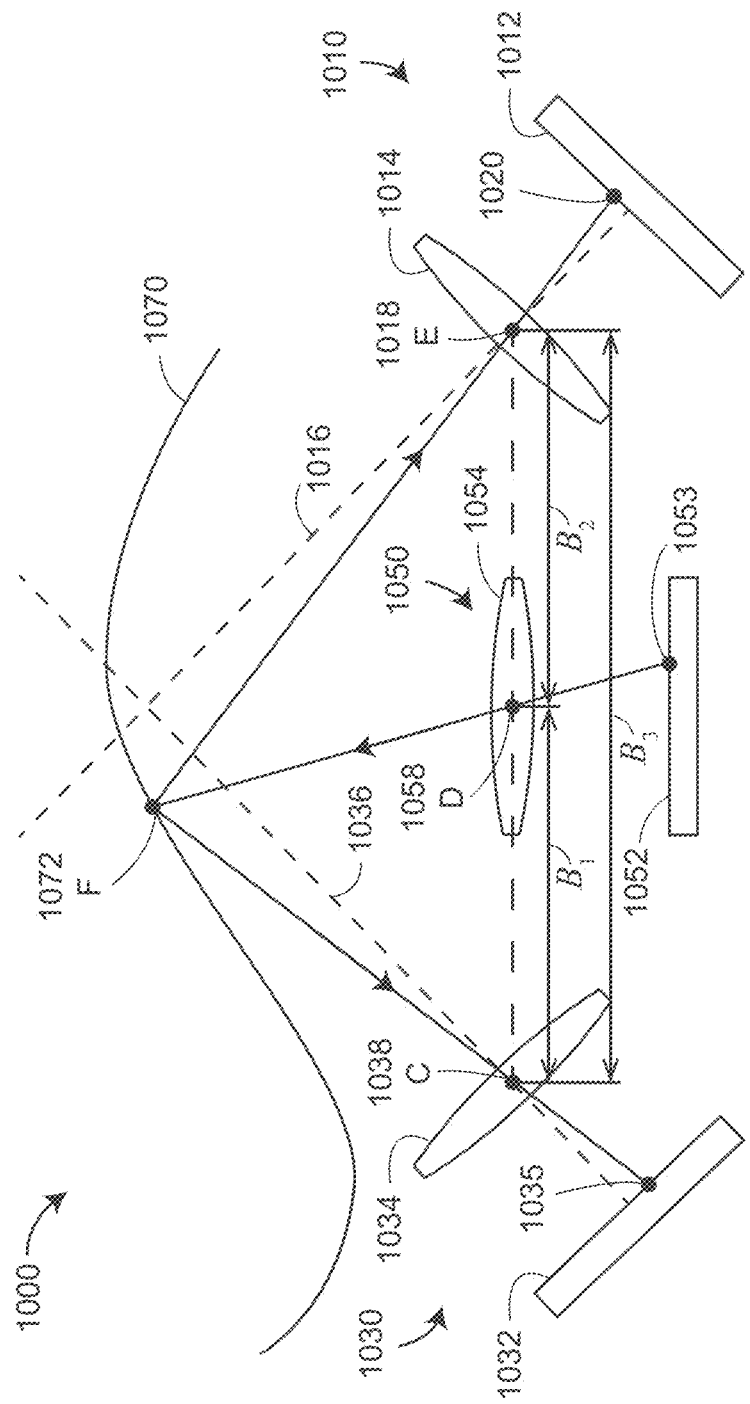
FIG. 10 is a schematic illustration of the principle of operation of a triangulation scanner having two cameras and one projector according to one or more embodiments described herein.

FIG. 10 shows a structured light triangulation scanner 1000 having a projector 1050, a first camera 1010, and a second camera 1030. The projector creates a pattern of light on a pattern generator plane 1052, which it projects from a corrected point 1053 on the pattern through a perspective center 1058 (point D) of the lens 1054 onto an object surface 1070 at a point 1072 (point F). The point 1072 is imaged by the first camera 1010 by receiving a ray of light from the point 1072 through a perspective center 1018 (point E) of a lens 1014 onto the surface of a photosensitive array 1012 of the camera as a corrected point 1020. The point 1020 is corrected in the read-out data by applying a correction factor to remove the effects of lens aberrations. The point 1072 is likewise imaged by the second camera 1030 by receiving a ray of light from the point 1072 through a perspective center 1038 (point C) of the lens 1034 onto the surface of a photosensitive array 1032 of the second camera as a corrected point 1035.

The inclusion of two cameras 1010 and 1030 in the system 1000 provides advantages over the device of FIG. 9 that includes a single camera. One advantage is that each of the two cameras has a different view of the point 1072 (point F). Because of this difference in viewpoints, it is possible in some cases to see features that would otherwise be obscured—for example, seeing into a hole or behind a blockage. In addition, it is possible in the system 1000 of FIG. 10 to perform three triangulation calculations rather than a single triangulation calculation, thereby improving measurement accuracy. A first triangulation calculation can be made between corresponding points in the two cameras using the triangle CEF with the baseline B3. A second triangulation calculation can be made based on corresponding points of the first camera and the projector using the triangle DEF with the baseline B2. A third triangulation calculation can be made based on corresponding points of the second camera and the projector using the triangle CDF with the baseline B1. The optical axis of the first camera 1020 is 1016, and the optical axis of the second camera 1030 is 1036.

Figure 11:
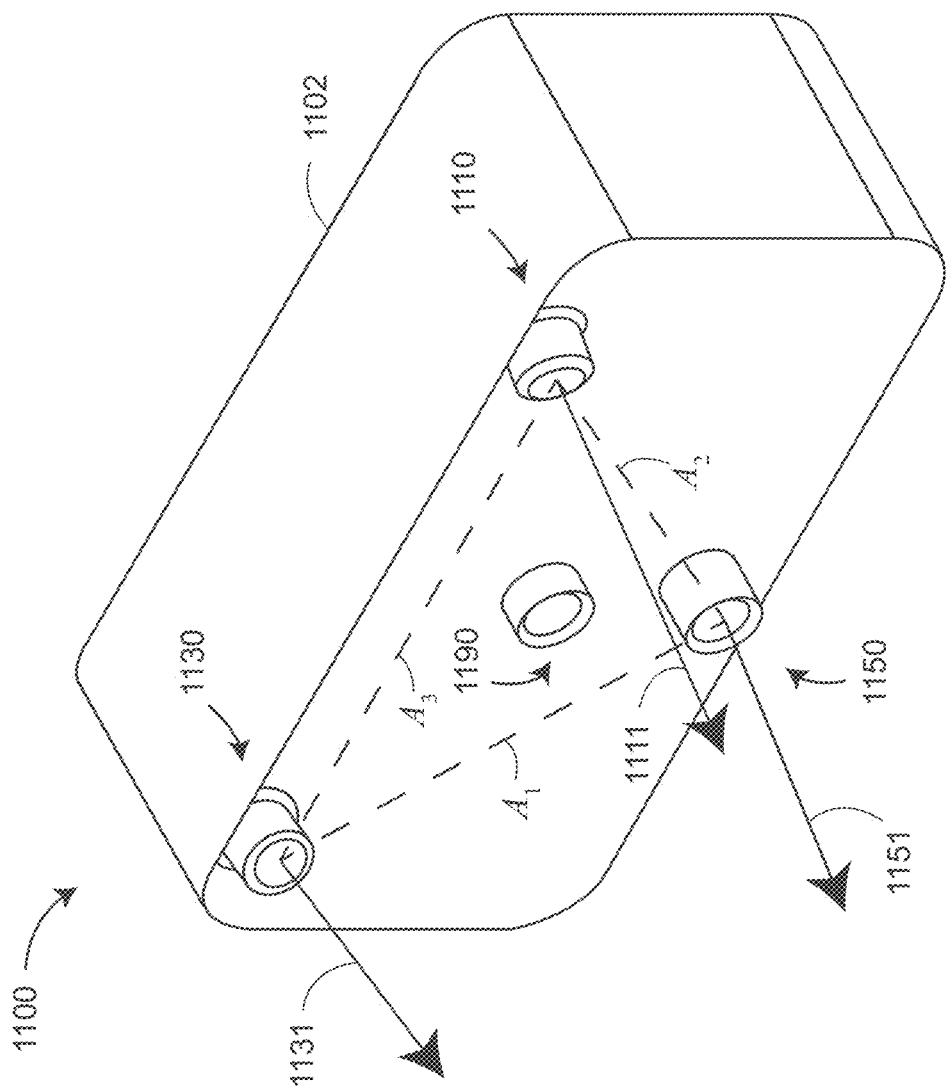
FIG. 11 is a perspective view of a scanner having cameras and one projector arranged in a triangle for 3D measurement according to one or more embodiments described herein.

FIG. 11 shows 3D imager 1100 having two cameras 1110, 1130 and a projector 1150 arranged in a triangle A1-A2-A3. In an embodiment, the 3D imager 1100 of FIG. 11 further includes a camera 1190 that may be used to provide color (texture) information for incorporation into the 3D image. In addition, the camera 1190 may be used to register multiple 3D images through the use of videogrammetry.

Figure 12A:
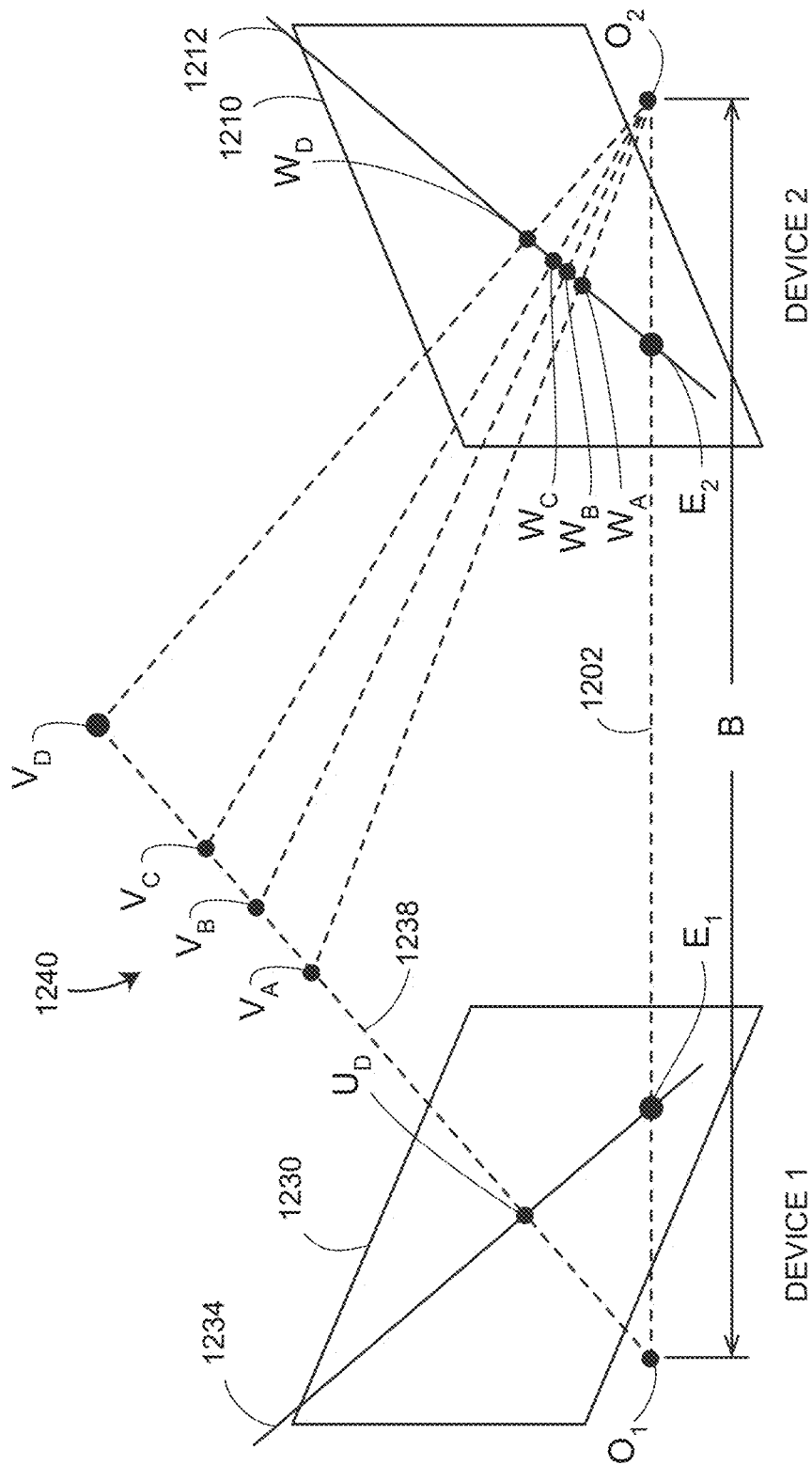
FIGS. 12A and 12B are schematic illustrations of the principle of operation of the scanner of FIG. 11.

This triangular arrangement provides additional information beyond that available for two cameras and a projector arranged in a straight line as illustrated in FIGS. 1 and 10. The additional information may be understood in reference to FIG. 12A, which explain the concept of epipolar constraints, and FIG. 12B that explains how epipolar constraints are advantageously applied to the triangular arrangement of the 3D imager 1100. In FIG. 12A, a 3D triangulation instrument 1240 includes a device 1 and a device 2 on the left and right sides of FIG. 12A, respectively. Device 1 and device 2 may be two cameras or device 1 and device 2 may be one camera and one projector. Each of the two devices, whether a camera or a projector, has a perspective center, O1 and O2, and a representative plane, 1230 or 1210. The perspective centers are separated by a baseline distance B, which is the length of the line 1202. The concept of perspective center is discussed in more detail in reference to FIGS. 13C, 13D, and 13E. Basically, the perspective centers O1, O2 are points through which rays of light may be considered to travel, either to or from a point on an object. These rays of light either emerge from an illuminated projector pattern, such as the pattern on illuminated projector pattern generator 912 of FIG. 9, or impinge on a photosensitive array, such as the photosensitive array 922 of FIG. 9. As can be seen in FIG. 9, the lens 914 lies between the illuminated object point 932 and plane of the illuminated object projector pattern generator 912. Likewise, the lens 924 lies between the illuminated object point 932 and the plane of the photosensitive array 922, respectively. However, the pattern of the front surface planes of devices 912 and 922 would be the same if they were moved to appropriate positions opposite the lenses 914 and 924, respectively. This placement of the reference planes 1230, 1210 is applied in FIG. 12A, which shows the reference planes 1230, 1210 between the object point and the perspective centers O1, O2.

In FIG. 12A, for the reference plane 1230 angled toward the perspective center O2 and the reference plane 1210 angled toward the perspective center O1, a line 1202 drawn between the perspective centers O1 and O2 crosses the planes 1230 and 1210 at the epipole points E1, E2, respectively. Consider a point UD on the plane 1230. If device 1 is a camera, it is known that an object point that produces the point UD on the image lies on the line 1238. The object point might be, for example, one of the points VA, VB, VC, or VD. These four object points correspond to the points WA, WB, WC, WD, respectively, on the reference plane 1210 of device 2. This is true whether device 2 is a camera or a projector. It is also true that the four points lie on a straight line 1212 in the plane 1210. This line, which is the line of intersection of the reference plane 1210 with the plane of O1-O2-UD, is referred to as the epipolar line 1212. It follows that any epipolar line on the reference plane 1210 passes through the epipole E2. Just as there is an epipolar line on the reference plane of device 2 for any point on the reference plane of device 1, there is also an epipolar line 1234 on the reference plane of device 1 for any point on the reference plane of device 2.

Figure 12B:
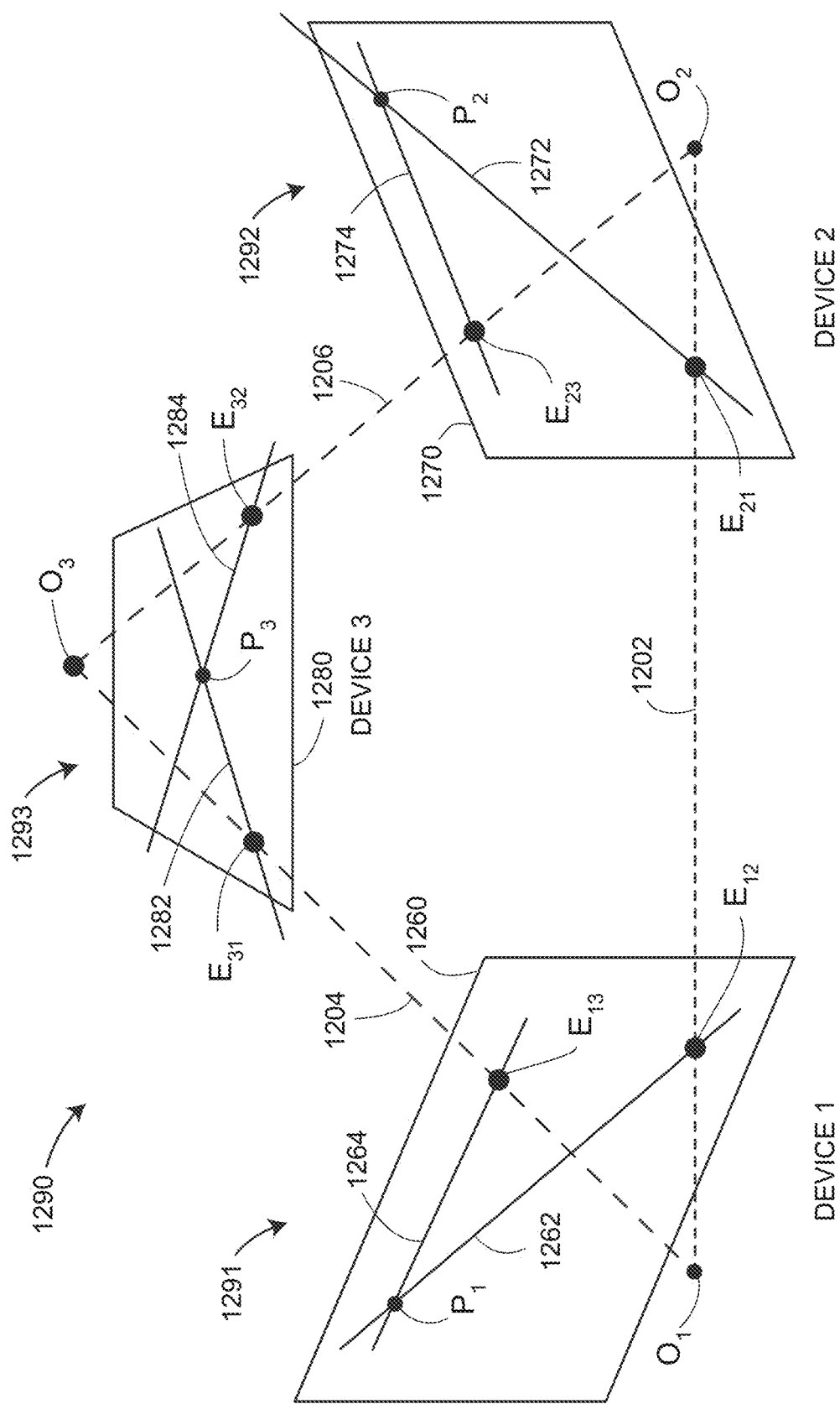

FIG. 12B illustrates the epipolar relationships for a 3D imager 1290 corresponding to 3D imager 1100 of FIG. 11 in which two cameras and one projector are arranged in a triangular pattern. In general, the device 1, device 2, and device 3 may be any combination of cameras and projectors as long as at least one of the devices is a camera. Each of the three devices 1291, 1292, 1293 has a perspective center O1, O2, O3, respectively, and a reference plane 1260, 1270, and 1280, respectively. Each pair of devices has a pair of epipoles. Device 1 and device 2 have epipoles E12, E21 on the planes 1260, 1270, respectively. Device 1 and device 3 have epipoles E13, E31, respectively on the planes 1260, 1280, respectively. Device 2 and device 3 have epipoles E23, E32 on the planes 1270, 1280, respectively. In other words, each reference plane includes two epipoles. The reference plane for device 1 includes epipoles E12 and E13. The reference plane for device 2 includes epipoles E21 and E23. The reference plane for device 3 includes epipoles E31 and E32.

Consider the situation of FIG. 12B in which device 3 is a projector, device 1 is a first camera, and device 2 is a second camera. Suppose that a projection point P3, a first image point P1, and a second image point P2 are obtained in a measurement. These results can be checked for consistency in the following way.

To check the consistency of the image point P1, intersect the plane P3-E31-E13 with the reference plane 1260 to obtain the epipolar line 1264. Intersect the plane P2-E21-E12 to obtain the epipolar line 1262. If the image point P1 has been determined consistently, the observed image point P1 will lie on the intersection of the determined epipolar lines 1262 and 1264.

To check the consistency of the image point P2, intersect the plane P3-E32-E23 with the reference plane 1270 to obtain the epipolar line 1274. Intersect the plane P1-E12-E21 to obtain the epipolar line 1272. If the image point P2 has been determined consistently, the observed image point P2 will lie on the intersection of the determined epipolar lines 1272 and 1274.

To check the consistency of the projection point P3, intersect the plane P2-E23-E32 with the reference plane 1280 to obtain the epipolar line 1284. Intersect the plane P1-E13-E31 to obtain the epipolar line 1282. If the projection point P3 has been determined consistently, the projection point P3 will lie on the intersection of the determined epipolar lines 1282 and 1284.

The redundancy of information provided by using a 3D imager 1100 having a triangular arrangement of projector and cameras may be used to reduce measurement time, to identify errors, and to automatically update compensation/calibration parameters.

An example is now given of a way to reduce measurement time. As explained herein below in reference to FIGS. 14A-D and FIG. 15, one method of determining 3D coordinates is by performing sequential measurements. An example of such a sequential measurement method described herein below is to project a sinusoidal measurement pattern three or more times, with the phase of the pattern shifted each time. In an embodiment, such projections may be performed first with a coarse sinusoidal pattern, followed by a medium-resolution sinusoidal pattern, followed by a fine sinusoidal pattern. In this instance, the coarse sinusoidal pattern is used to obtain an approximate position of an object point in space. The medium-resolution and fine patterns used to obtain increasingly accurate estimates of the 3D coordinates of the object point in space. In an embodiment, redundant information provided by the triangular arrangement of the 3D imager 1100 eliminates the step of performing a coarse phase measurement. Instead, the information provided on the three reference planes 1260, 1270, and 1280 enables a coarse determination of object point position. One way to make this coarse determination is by iteratively solving for the position of object points based on an optimization procedure. For example, in one such procedure, a sum of squared residual errors is minimized to select the best-guess positions for the object points in space.

The triangular arrangement of 3D imager 1100 may also be used to help identify errors. For example, a projector 1293 in a 3D imager 1290 may project a coded pattern onto an object in a single shot with a first element of the pattern having a projection point P3. The first camera 1291 may associate a first image point P1 on the reference plane 1260 with the first element. The second camera 1292 may associate the first image point P2 on the reference plane 1270 with the first element. The six epipolar lines may be generated from the three points P1, P2, and P3 using the method described herein above. The intersection of the epipolar lines lie on the corresponding points P1, P2, and P3 for the solution to be consistent. If the solution is not consistent, additional measurements of other actions may be advisable.

The triangular arrangement of the 3D imager 1100 may also be used to automatically update compensation/calibration parameters. Compensation parameters are numerical values stored in memory, for example, in the internal electrical system 700 or in another external computing unit. Such parameters may include the relative positions and orientations of the cameras and projector in the 3D imager.

The compensation parameters may relate to lens characteristics such as lens focal length and lens aberrations. They may also relate to changes in environmental conditions such as temperature. Sometimes the term calibration is used in place of the term compensation. Often compensation procedures are performed by the manufacturer to obtain compensation parameters for a 3D imager. In addition, compensation procedures are often performed by a user. User compensation procedures may be performed when there are changes in environmental conditions such as temperature. User compensation procedures may also be performed when projector or camera lenses are changed or after then instrument is subjected to a mechanical shock. Typically user compensations may include imaging a collection of marks on a calibration plate.

Inconsistencies in results based on epipolar calculations for a 3D imager 1290 may indicate a problem in compensation parameters. In some cases, a pattern of inconsistencies may suggest an automatic correction that can be applied to the compensation parameters. In other cases, the inconsistencies may indicate that user compensation procedures should be performed.

Figure 13A:
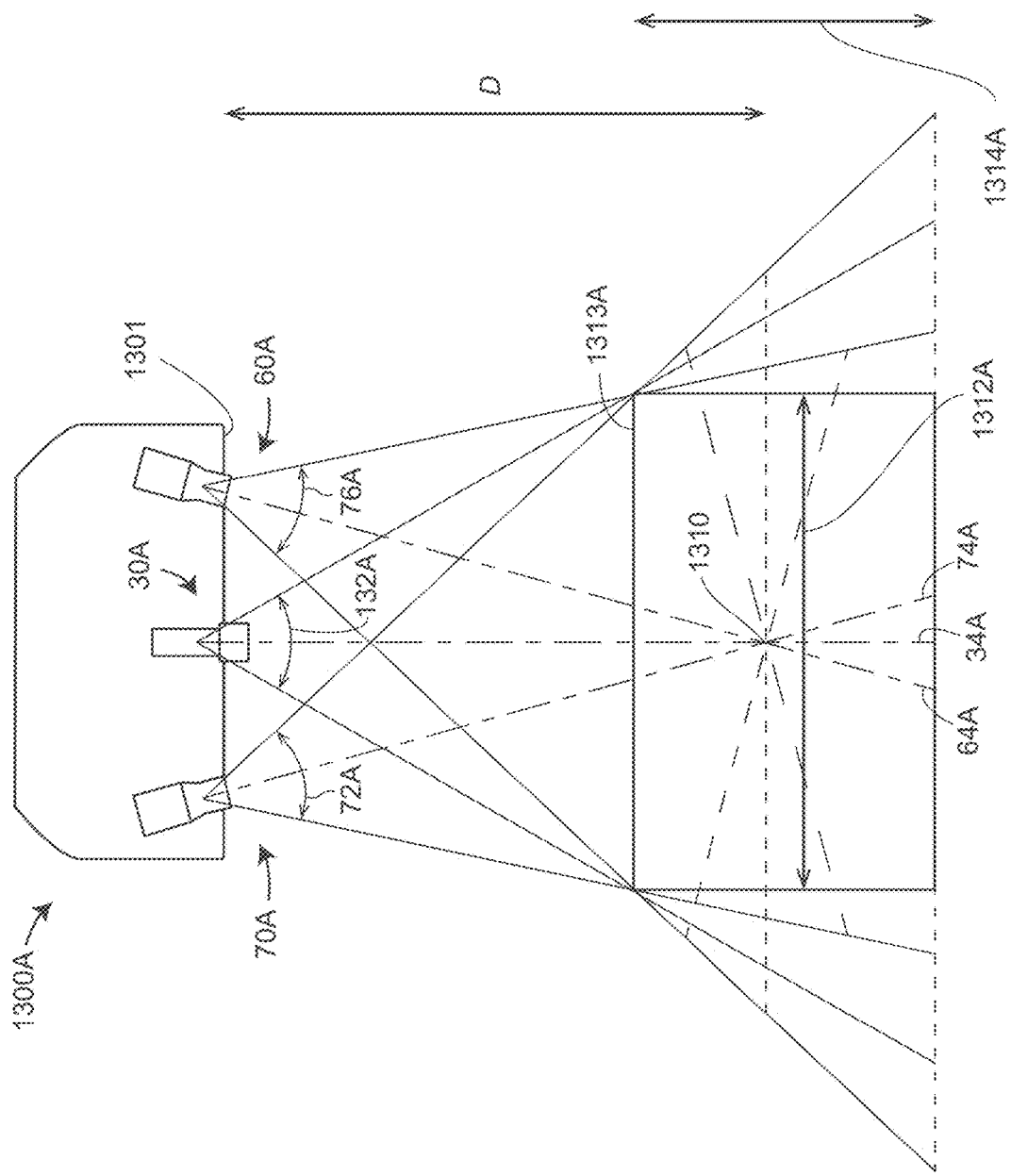
FIGS. 13A and 13B are schematic illustrations of 3D imagers having wide field-of-view (FOV) lenses and narrow FOV lenses, respectively, according to one or more embodiments described herein.
Figure 13B:
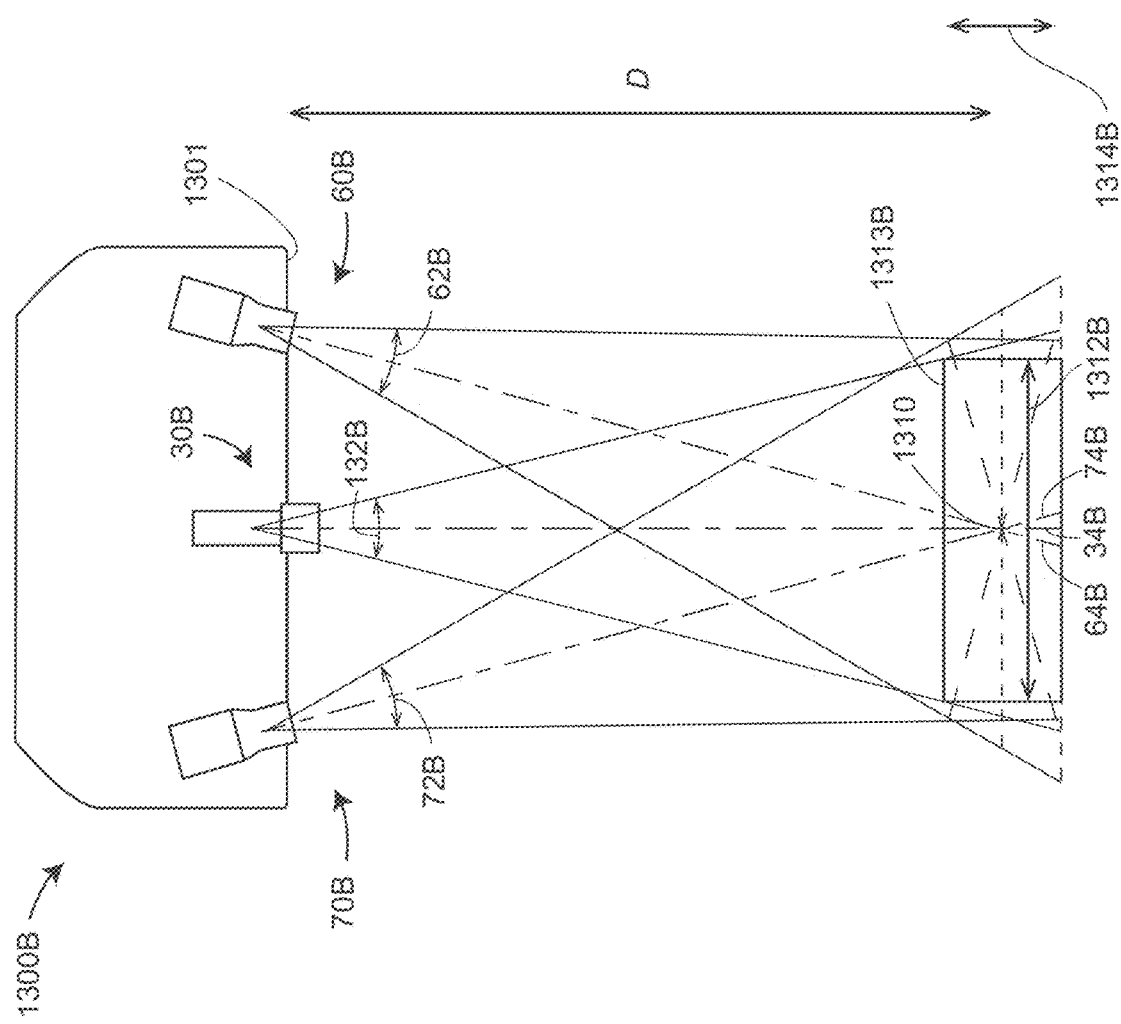

FIGS. 13A and 13B show two versions 1300A and 1300B, respectively, of the 3D imager 10. The 3D imager 1300A includes relatively wide FOV projector and camera lenses, while the 3D imager 1300B includes relatively narrow FOV projector and camera lenses. The FOVs of the wide-FOV cameras 70A, 60A and projector 30A of FIG. 13A are 72A, 62A, and 132A, respectively. The FOVs of the narrow-FOV cameras 70B, 60B and projector 30B of FIG. 13B are 72B, 62B, 132B, respectively. The standoff distance D of the 3D imager 1300A is the distance from the front 1301 of the scanner body to the point of intersection 1310 of the optical axes 74A and 64A of the camera lens assemblies 70A and 70B, respectively, with the optical axis 34A of the projector 30A. In an embodiment, the standoff distance D of the 3D imager 1300B is the same as the standoff distance D of the 3D imager 1300A. This occurs when the optical taxis 74B of the lens assembly 70B is the same as the optical axis 74A of the lens assembly 70A, which is to say that the assemblies 70A and 70B are pointed in the same direction. Similarly, the optical axes 34B and 34A have the same direction, and the optical axes 64A and 64B have the same direction. Because of this, the optical axes of the 3D imagers 1300A and 1300B intersect at the same point 1310. To achieve this result, lens assemblies 30A, 60A, and 70A are designed and constructed to be interchangeable without requiring fitting to each particular frame 10. This enables a user to purchase a lens off the shelf that is compatible with the configuration of imager 1300A, imager 1300B, or other compatible imagers. In addition, in an embodiment, such replacement lenses may be purchased without requiring adjustment of the lens to accommodate variations in the 3D imager.

Because the nominal standoff distance D is the same for 3D imagers 1300A and 1300B, the narrow-FOV camera lenses 60B and 70B have longer focal lengths than the wide-FOV camera lenses 60A and 70A if the photosensitive array is the same size in each case. In addition, as shown in FIGS. 13A and 13B, the width 1312B of the measurement region 1313B is smaller than the width 1312A of the measurement region 1312A. In addition, if the diameters of lens apertures are the same in each case, the depth 1314B (the depth of field (DOF)) of the measurement region 1313B is smaller than the depth 1314A (DOF) of the measurement region 1313A. In an embodiment, 3D imagers 10 are available with different fields of view and different image sensor resolution and size.

Figure 13C:
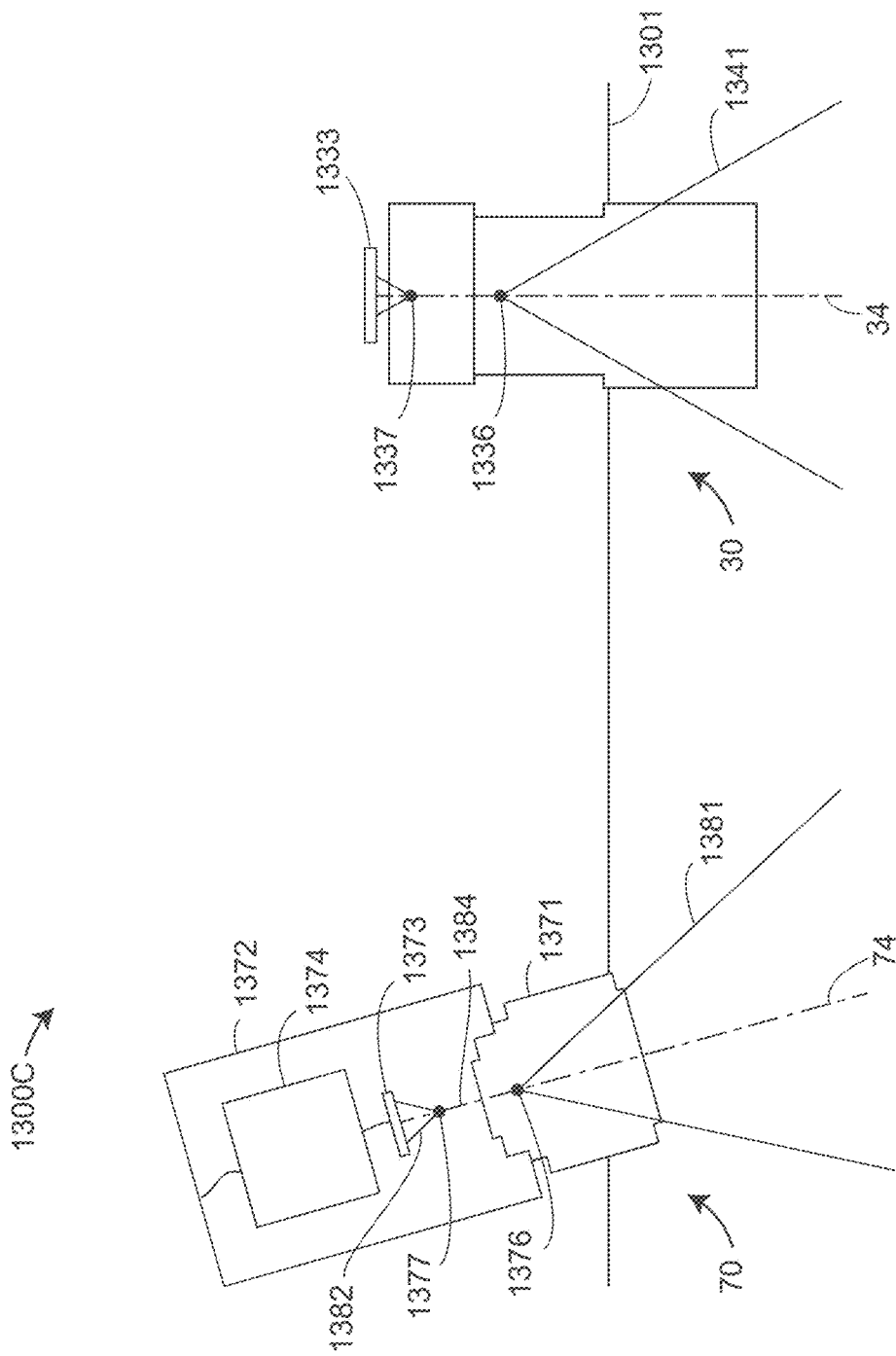
FIG. 13C is a schematic representation of camera and projector lenses according to one or more embodiments described herein.

FIG. 13C shows a cross-sectional schematic representation 1300C of a camera assembly 70 and a projector 30 according to one or more embodiments described herein. The camera lens assembly 70 includes a perspective center 1376, which is the center of the lens entrance pupil. The entrance pupil is defined as the optical image of the physical aperture stop as seen through the front of the lens system. The ray that passes through the center of the entrance pupil is referred to as the chief ray, and the angle of the chief ray indicates the angle of an object point as received by the camera. A chief ray may be drawn from each illuminated point on the object through the entrance pupil. For example, the ray 1381 is a chief ray that defines the angle of an object point (on the ray) with respect to the camera lens 1371. This angle is defined with respect to an optical axis 74 of the lens 3171.

The exit pupil is defined as the optical image of the physical aperture stop as seen through the back of the lens system. The point 1377 is the center of the exit pupil. The chief ray travels from the point 1377 to a point on the photosensitive array 1373. In general, the angle of the chief ray as it leaves the exit pupil is different than the angle of the chief ray as it enters the perspective center (the entrance pupil). To simplify analysis, the ray path following the entrance pupil is adjusted to enable the beam to travel in a straight line through the perspective center 1376 to the photosensitive array 1373 as shown in FIGS. 13D and 13E. Three mathematical adjustments are made to accomplish this. First, the position of each imaged point on the photosensitive array is corrected to account for lens aberrations and other systematic error conditions. This may be done by performing compensation measurements of the lenses in the cameras 70, 60 and the projector 30. Such compensation measurement may include, for example, measuring a calibration dot plate in a prescribed arrangement and sequence to obtain aberration coefficients or an aberration map for the lenses. Second, the angle of the ray 1382 is changed to equal the angle of the ray 1381 that passes through the perspective center 1376. The distance from the exit pupil 1377 to the photosensitive array 1373 is adjusted accordingly to place the image points at the aberration-corrected points on the photosensitive array 1373. Third, the point 1377 is collapsed onto the perspective center to remove the space 1384, enabling all rays of light 1381 emerging from the object to pass a straight line through the point 1376 onto the photosensitive array 1373, as shown in FIG. 13E. By this means, the exact path of each beam of light passing through the optical system of the camera 70C may be simplified for rapid mathematical analysis by the electrical circuit and processor 1374 in a mount assembly 1372. In the discussion herein below, the term perspective center is taken to be the center of the entrance pupil with the lens model revised to enable rays to be drawn straight through the perspective center to a camera photosensitive array or straight through the perspective center to direct rays from a projector pattern generator device.

Referring again to FIG. 13C, the projector assembly 3C has a perspective center 1336, a center of an exit pupil 1337, an optical axis 34, and a projector pattern array 1333. As in the camera assembly 70, mathematical corrections are made to enable a ray from light 1341 to travel straight through the perspective center 1336 from the projector pattern plane 1333 to an object. In an embodiment, the projector pattern array 1333 is the DMD 53 shown in FIG. 5A.

Figure 14A:
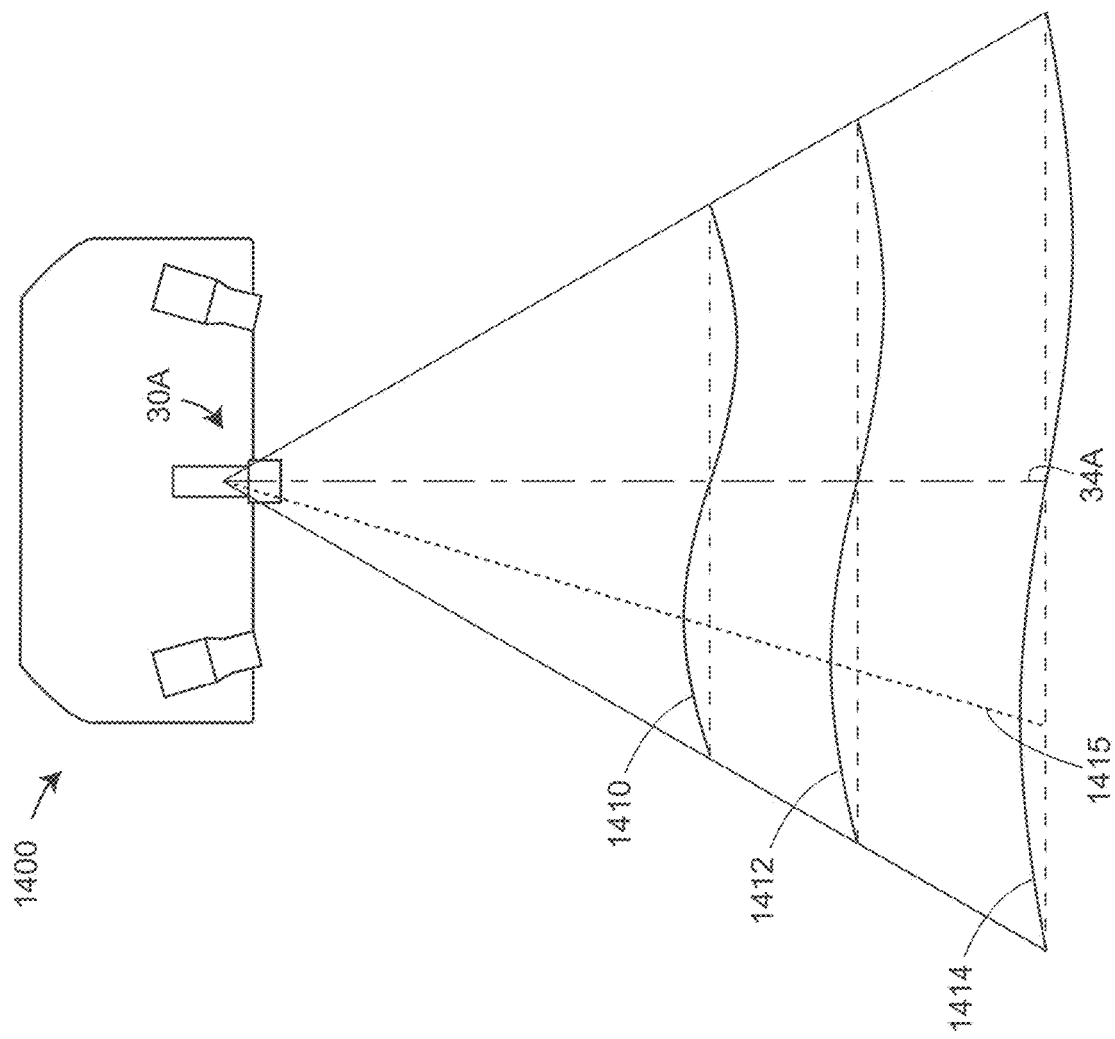
FIG. 14A illustrates projection of a coarse sine-wave pattern according to one or more embodiments described herein.

An explanation is now given for a known method of determining 3D coordinate on an object surface using a sinusoidal phase-shift method, as described with reference to FIGS. 14A-D and FIG. 15. FIG. 14A illustrates projection of a sinusoidal pattern by the projector 30A. In an embodiment, the sinusoidal pattern in FIG. 14A varies in optical power from completely dark to completely bright. A minimum position on the sine wave in FIG. 14A corresponds to a dark projection and a maximum position on the sine wave corresponds to a bright projection. The projector 30A projects light along rays that travel in constant lines emerging from the perspective center of the projector lens. Hence in FIG. 14A, a line along the optical axis 34A in FIG. 14A represents a point neither at a maximum or minimum of the sinusoidal pattern and hence represents an intermediate brightness level. The relative brightness will be the same for all points lying on a ray projected through the perspective center of the projector lens. So, for example, all points along the ray 1415 are at maximum brightness level of the sinusoidal pattern. A complete sinusoidal pattern occurs along the lines 1410, 1412, and 1414, even though the lines 1410, 1412, and 1414 have different lengths.

Figure 14B:
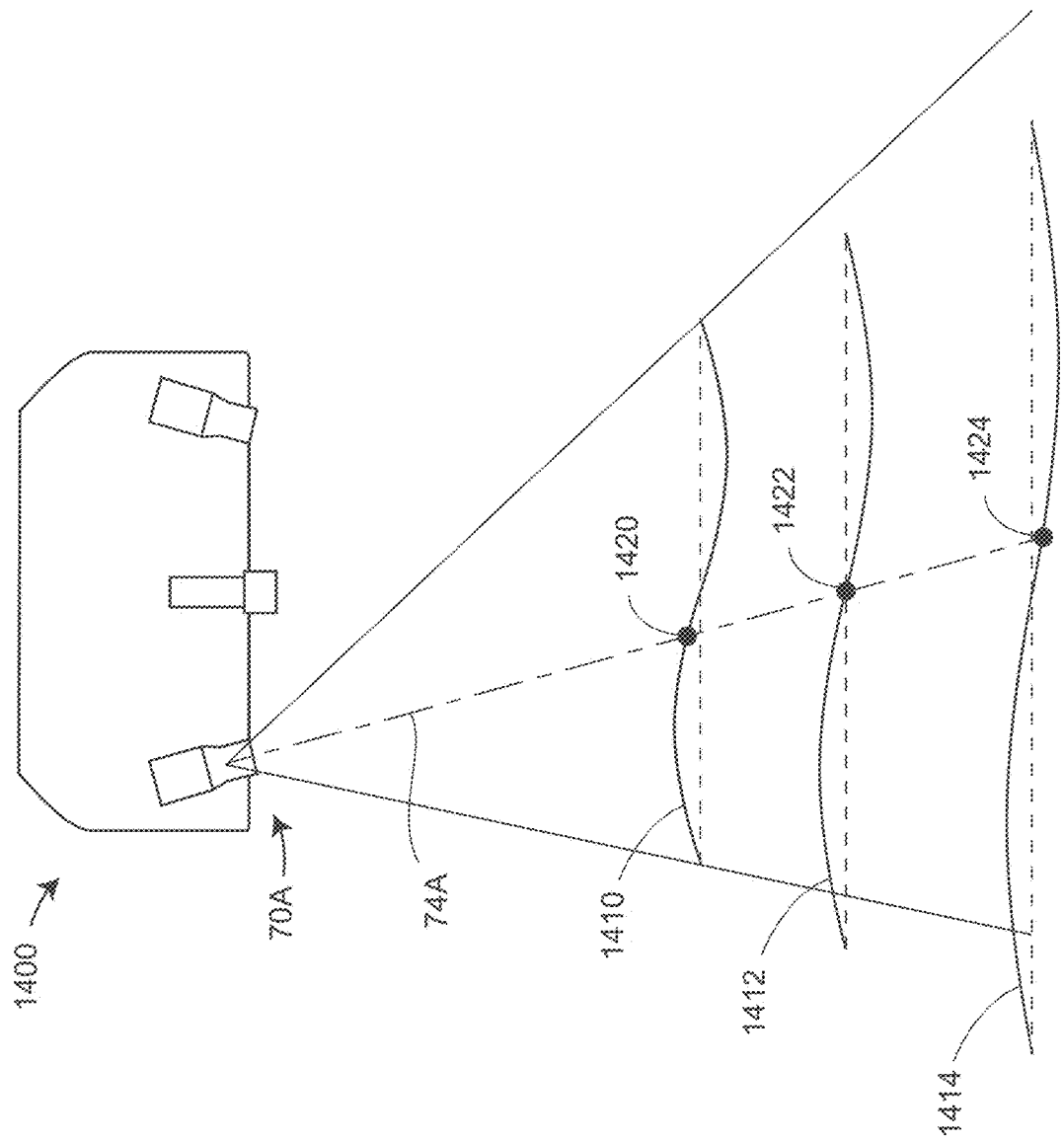
FIG. 14B illustrates reception of the coarse sine-wave pattern by a camera lens according to one or more embodiments described herein.

In FIG. 14B, a given pixel of a camera 70A may see any of a collection of points that lie along a line drawn from the pixel through the perspective center of the camera lens assembly. The actual point observed by the pixel will depend on the object point intersected by the line. For example, for a pixel aligned to the optical axis 74A of the lens assembly 70A, the pixel may see a point 1420, 1422, or 1424, depending on whether the object lies along the lines of the patterns 1410, 1412, or 1414, respectively. Notice that in this case the position on the sinusoidal pattern is different in each of these three cases. In this example, the point 1420 is brighter than the point 1422, which is brighter than the point 1424.

FIG. 14C illustrates projection of a sinusoidal pattern by the projector 30A, but with more cycles of the sinusoidal pattern projected into space. FIG. 14C illustrates the case in which ten sinusoidal cycles are projected rather than one cycle. The cycles 1430, 1433, and 1434 are projected at the same distances from the scanner 1400 as the lines 1410, 1412, and 1414, respectively, in FIG. 14A. In addition, FIG. 14C shows an additional sinusoidal pattern 1433.

In FIG. 14D, a pixel aligned to the optical axis 74A of the lens assembly 70A sees the optical brightness levels corresponding to the positions 1440, 1442, 1444, and 1446 for the four sinusoidal patterns illustrated in FIG. 14D. Notice that the brightness level at a point 1440 is the same as at the point 1444. As an object moves farther away from the scanner 1400, from the point 1440 to the point 1444, it first gets slightly brighter at the peak of the sine wave, and then drops to a lower brightness level at position 1442, before returning to the original relative brightness level at 1444.

In a phase-shift method of determining distance to an object, a sinusoidal pattern is shifted side-to-side in a sequence of at least three phase shifts. For example, consider the situation illustrated in FIG. 15. In this figure, a point 1502 on an object surface 1500 is illuminated by the projector 30A. This point is observed by the camera 70A and the camera 60A. Suppose that the sinusoidal brightness pattern is shifted side-to-side in four steps to obtained shifted patterns 1512, 1514, 1516, and 1518. At the point 1502, each of the cameras 70A and 60A measure the relative brightness level at each of the four shifted patterns. If for example the phases of the sinusoids for the four measured phases are $\square$={160o, 250o, 340o, 70o} for the positions 1522, 1524, 1526, and 1528, respectively, the relative brightness levels measured by the cameras 70A and 60A at these positions are (1+sin ($\square$))/2, or 0.671, 0.030, 0.329, and 0.969, respectively. A relatively low brightness level is seen at position 1424, and a relatively high brightness level is seen at the position 1528.

By measuring the amount of light received by the pixels in the cameras 70A and 60A, the initial phase shift of the light pattern 1512 can be determined. As suggested by FIG. 14D, such a phase shift enables determination of a distance from the scanner 1400, at least as long as the observed phases are known to be within a 360 degree phase range, for example, between the positions 1440 and 1444 in FIG. 14D. A quantitative method is known in the art for determining a phase shift by measuring relative brightness values at a point for at least three different phase shifts (side-to-side shifts in the projected sinusoidal pattern). For a collection of N phase shifts of sinusoidal signals resulting in measured relative brightness levels xi, a general expression for the phase $\square$ is given by $\square$=tan−1 (−bi/ai)0.5, where ai=$\square\square$xj cos(2$\square$j/N) and bi=$\square\square$xj sin(2$\square$j/N), the summation being taken over integers from j=0 to N−1. For some embodiments, simpler formulas may be used. For example, for the embodiment of four measured phases each shifted successively by 90 degrees, the initial phase value is given by tan−1 ((x4−x2)/(x1−x3)).

Figure 15:
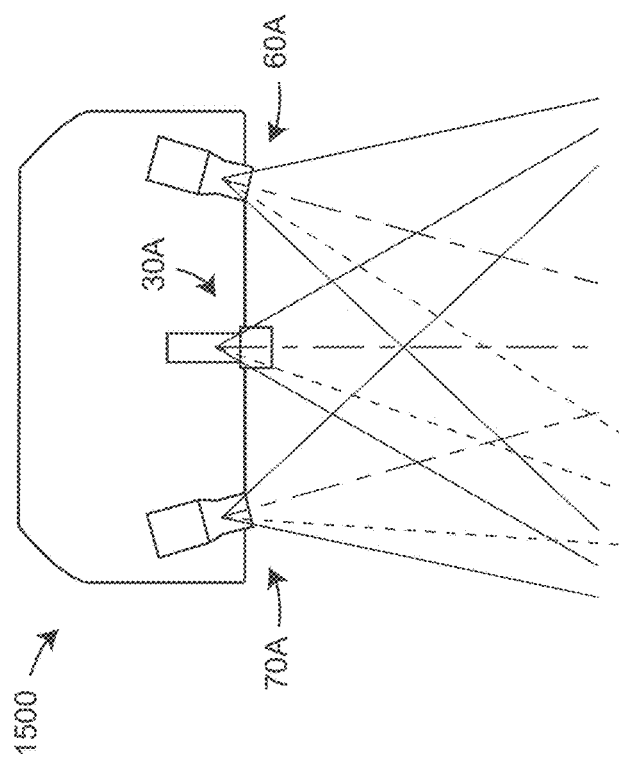
FIG. 15 illustrates how phase is determined from a set of shifted sine waves according to one or more embodiments described herein.
Figure 15:
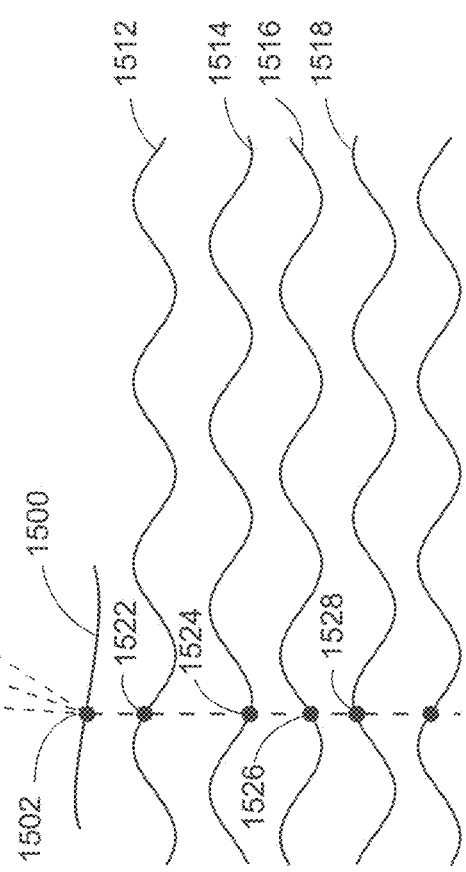

The phase shift method of FIG. 15 may be used to determine the phase to within one sine wave period, or 360 degrees. For a case such as in FIG. 14D wherein more than one 360 interval is covered, the procedure may further include projection of a combination of relatively coarse and relatively fine phase periods. For example, in an embodiment, the relatively coarse pattern of FIG. 14A is first projected with at least three phase shifts to determine an approximate distance to the object point corresponding to a particular pixel on the camera 70A. Next the relatively fine pattern of FIG. 14C is projected onto the object with at least three phase shifts, and the phase is determined using the formulas given above. The results of the coarse phase-shift measurements and fine phase-shift measurements are combined to determine a composite phase shift to a point corresponding to a camera pixel. If the geometry of the scanner 1500 is known, this composite phase shift is sufficient to determine the three-dimensional coordinates of the point corresponding to a camera pixel using the methods of triangulation, as discussed herein above with respect to FIG. 9. The term "unwrapped phase" is sometimes used to indicate a total or composite phase shift.

An alternative method of determining 3D coordinates using triangulation methods is by projecting coded patterns. If a coded pattern projected by the projector is recognized by the camera(s), then a correspondence between the projected and imaged points can be made. Because the baseline and two angles are known for this case, the 3D coordinates for the object point can be determined.

An advantage of projecting coded patterns is that 3D coordinates may be obtained from a single projected pattern, thereby enabling rapid measurement, which is desired for example in handheld scanners. One disadvantage of projecting coded patterns is that background light can contaminate measurements, reducing accuracy. The problem of background light is avoided in the sinusoidal phase-shift method since background light, if constant, cancels out in the calculation of phase.

One way to preserve accuracy using the phase-shift method while minimizing measurement time is to use a scanner having a triangular geometry, as in FIG. 11. The three combinations of projector-camera orientation provide redundant information that may be used to eliminate some of the ambiguous intervals. For example, the multiple simultaneous solutions possible for the geometry of FIG. 11 may eliminate the possibility that the object lies in the interval between the positions 1444 and 1446 in FIG. 14D. This knowledge may eliminate a step of performing a preliminary coarse measurement of phase, as illustrated for example in FIG. 14B. An alternative method that may eliminate some coarse phase-shift measurements is to project a coded pattern to get an approximate position of each point on the object surface.

Example 3D imagers (i.e., scanners) having been described, example methods for training a machine learning model and for performing inference using the machine learning model are now described. In particular, FIG. 16 depicts a method 1600 for training a machine learning model to take as input a single image (or image pair) of an object and provided as output a disparity map that is used to compute 3D point coordinates associated with the object according to one or more embodiments described herein.

At block 1602, the method 1600 includes a processing system (e.g., the processing system 120 of FIG. 1) receiving a training data (e.g., the training data 118 of FIG. 1) collected by a three-dimensional (3D) imager (e.g., one of the scanners as described herein, such as the scanner 110 of FIG. 1). The training data includes a plurality of training sets. In examples, each training set (i.e., an image pair) includes a left camera training image (e.g., from the left camera 114) and a right camera training image (e.g., from the right camera 116). In other examples, the training set includes images from only one of the left or right cameras 114 or 116). The training data also includes, in one or more examples, a disparity training map. The disparity map encodes the difference in pixels for each point seen by both the left camera 114 and the right camera 116 viewpoints. That is, the disparity map encodes the difference in pixels between two images in an image pair. The disparity map can be calculated by the scanner 110, the processing system 120, or any other suitable device.

Figure 17A:
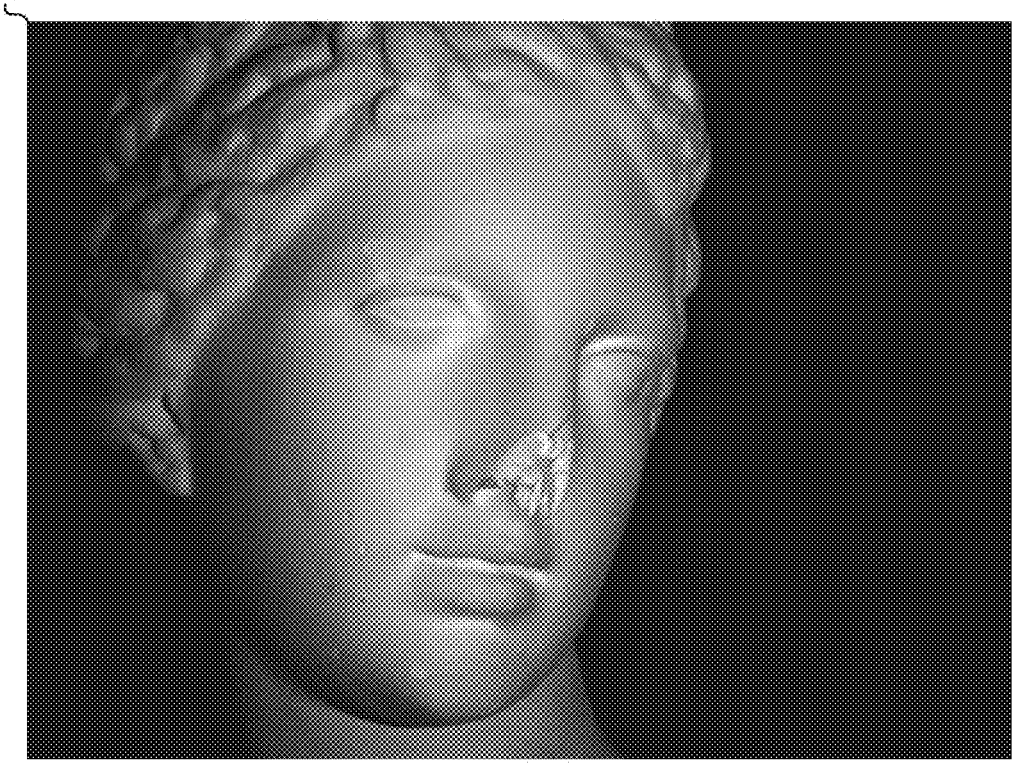
FIG. 17A depicts an example of a left image and a right image of an object according to one or more embodiments described herein.
Figure 17A:
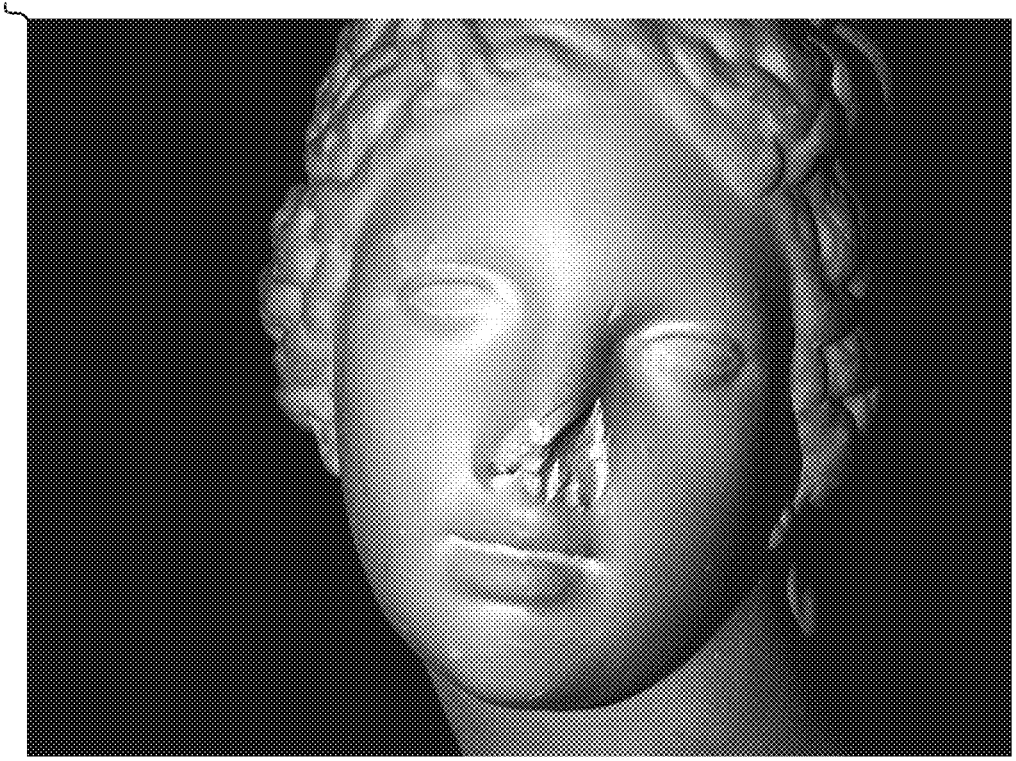
Figure 17B:
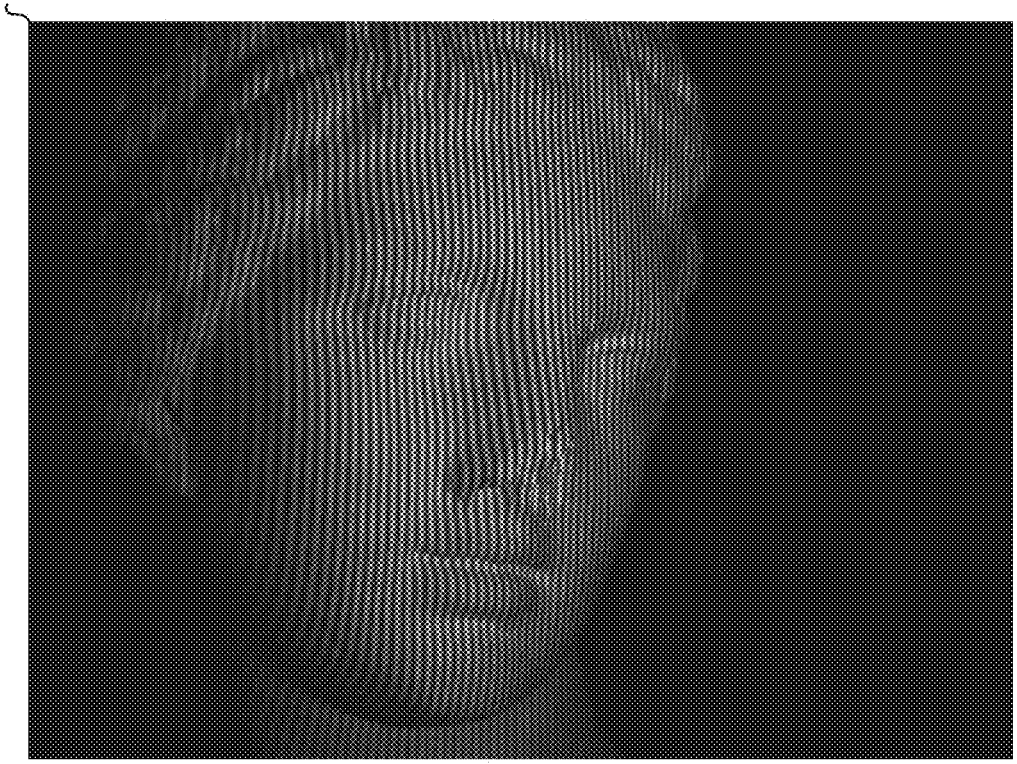
FIG. 17B depicts an example of a training set (image pair) including a left camera training image and a right camera training image according to one or more embodiments described herein.
Figure 17B:
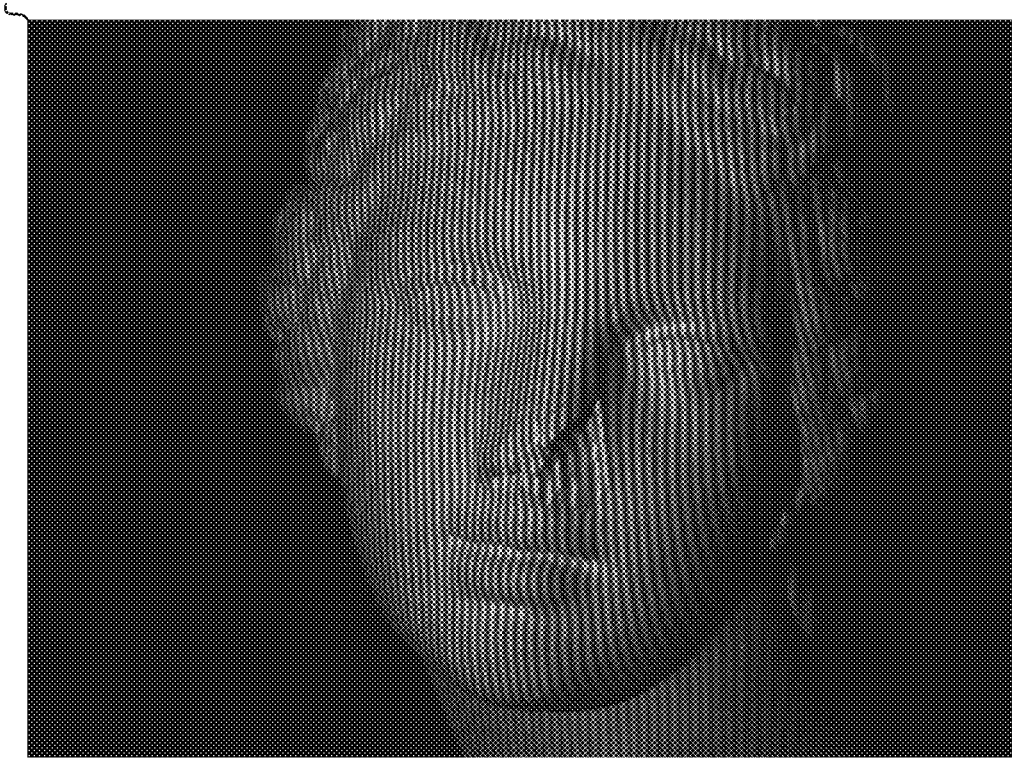
Figure 17C:
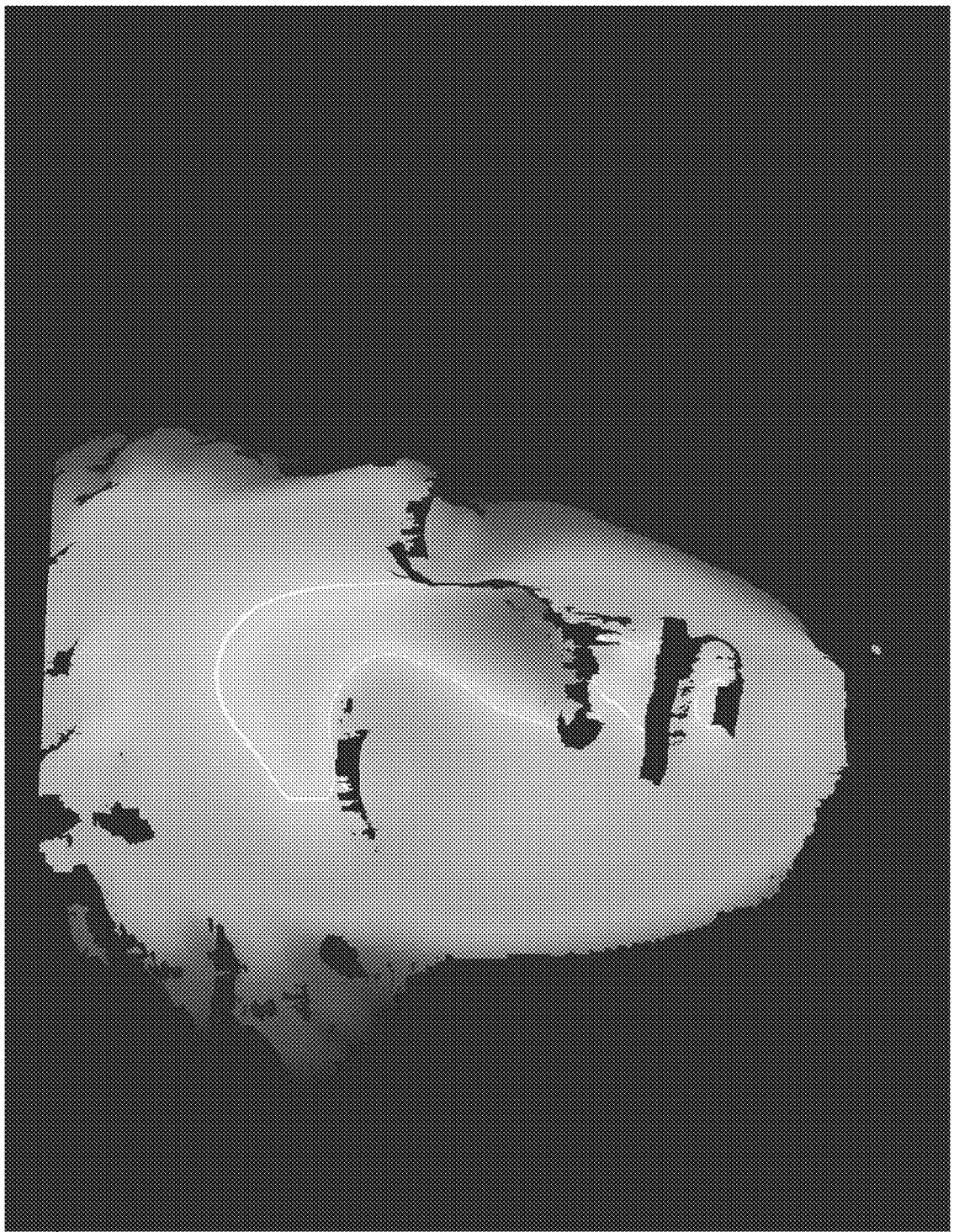
FIG. 17C depicts a disparity map calculated for the training image pair of FIG. 17B according to one or more embodiments described herein.

An example of training data are now described with reference to FIGS. 17A, 17B, and 17C. Particularly, FIG. 17A depicts an example of a left image 1702 and a right image 1704 of an object, such as the object 102 of FIG. 1. FIG. 17B depicts an example of a training set (image pair) including a left camera training image 1712 and a right camera training image 1714. It should be appreciate that FIG. 17B depicts one example of a training set, but other examples are also suitable and within the scope of the present disclosure. For example, the training set can be a single image, a pair of images, or a pair of images in combination with a ground truth disparity map. The left camera training image 1712 and the right camera training image 1714 have a pattern projected thereon as shown by the substantially horizontal lines in each of the images 1712, 1714. Together, the left camera training image 1712 and the right camera training image 1714 form a training image pair. A disparity map is then calculated for the training image pair. For example, FIG. 17C depicts a ground truth disparity map 1720 calculated for the training image pair of FIG. 17B (i.e., for the left camera training image 1712 and the right camera training image 1714).

Figure 16:
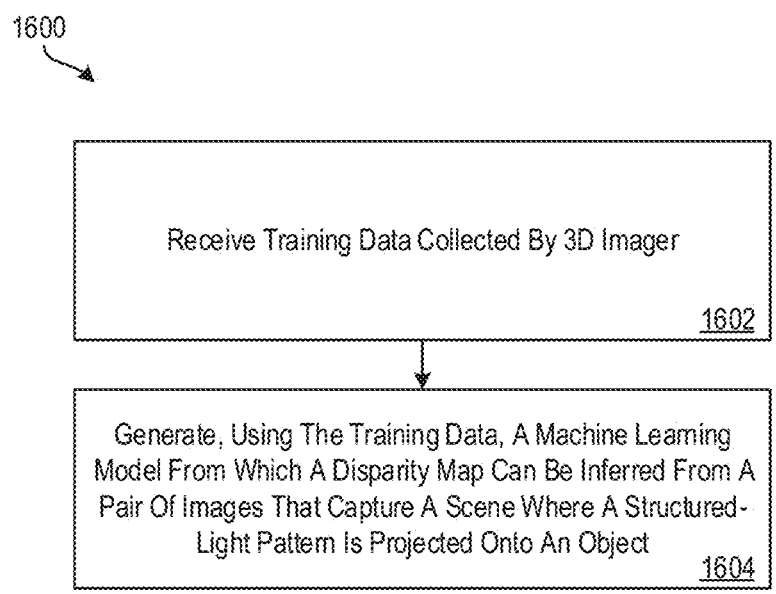
FIG. 16 depicts a method for training a machine learning model to take as input a single image (or image pair) of an object and provided as output a disparity map that is used to compute 3D point coordinates associated with the object according to one or more embodiments described herein.

With continued reference to FIG. 16, at block 1604, the method 1600 includes the processing system (e.g., the processing system 120 using the machine learning engine 126) generating, using the training data (e.g., the training data 118), a machine learning model (e.g., the machine learning model 128 from which a disparity map can be inferred from a pair of images that capture a scene where a light pattern is projected onto an object. The machine learning model 128 can be trained using different training techniques, which are now described with reference to FIGS. 18 and 19.

Figure 18:
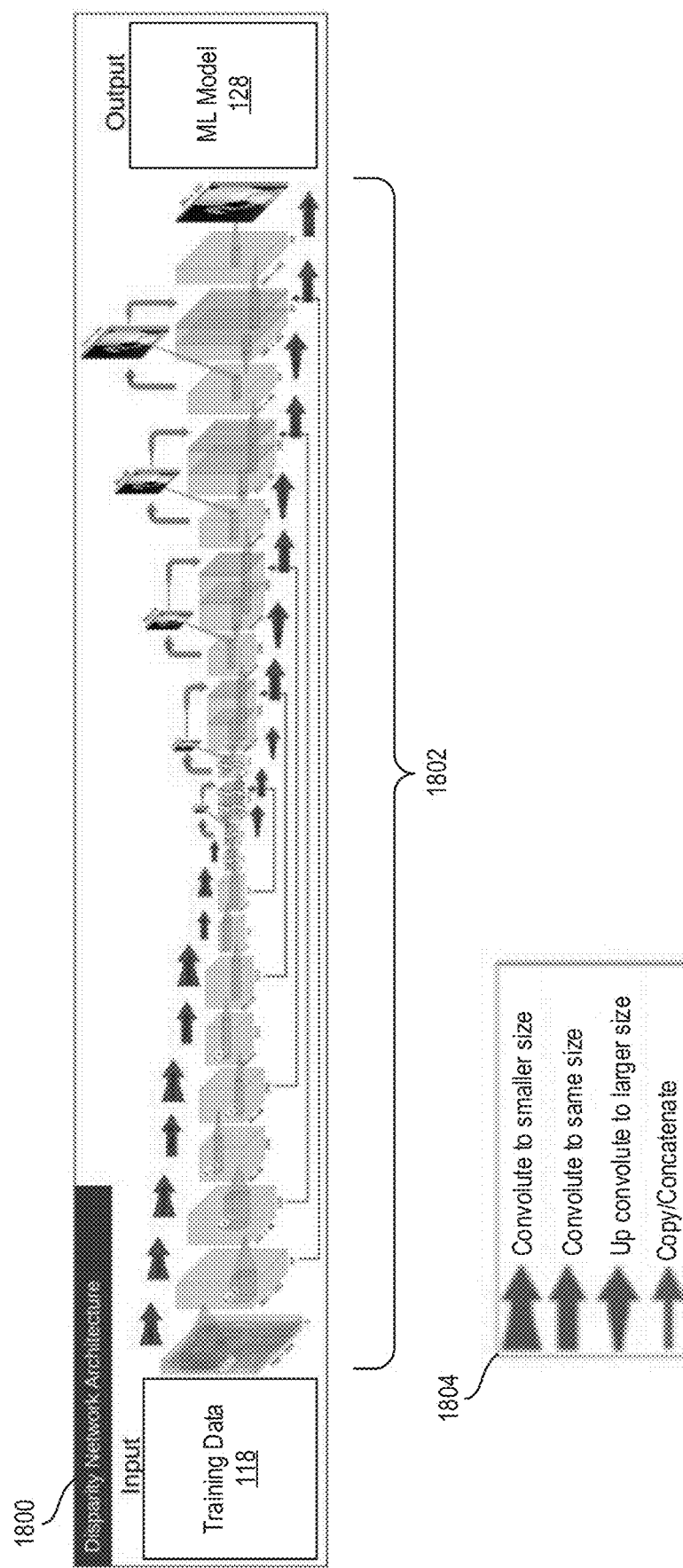
FIG. 18 depicts a disparity neural network approach to training a machine learning model according to one or more embodiments described herein.

Consider the example shown in FIG. 18 in which the machine learning engine 126 can use a neural network-based approach to train the machine learning model 128. In this example, a modified architecture of a disparity neural network architecture is created from a simple convolutional neural network to an auto encoder based architecture. FIG. 18 depicts such a modified architecture of a disparity neural network 1800 according to one or more embodiments described herein. In this example, the training data 118 (including a left image from the left camera 114, a right image from the right camera 116, and a disparity map based on the left image and the right image) are input into the disparity neural network 1800. In some examples, the training data 118 includes a visualized disparity map (e.g., the ground truth disparity map 1720 of FIG. 17C) and also includes the data values that make up the disparity map (referred to as a ground truth disparity map). Disparity is a 1D problem with known structure on rectified images. Images are processed separately to extract features before joining the images. The disparity neural network 1800 can explicit feature correlation on scanlines to enable efficient matching.

As shown in FIG. 18, the disparity neural network 1800 includes layers 1802 that try to recreate the input disparity map based on the left image and the right image to generate a predicted disparity map. The layers perform various tasks as shown by the arrows (see legend 1804). For example, the layers 1802 can convolute to a smaller size, convolute to the same size, up convolute to a larger size, and/or copy/ concatenate. Then, the disparity neural network 1800 tries to recreate the predicted disparity map by matching the input images (the left and right images) to determine the correct disparity value, which is given by the inputted (ground truth) disparity map. This process loops, for example, until an acceptable entropy between the predicted and ground truth disparity maps is achieved. This results in a trained neural network (e.g., the machine learning model 128). The predictions that the trained neural network outputs feature a disparity map with a small computational cost because it is a resource cheap evaluation of two sinusoidal images (e.g., the left and right images). This approach represents a neural network based approach to machine learning.

Figure 19:
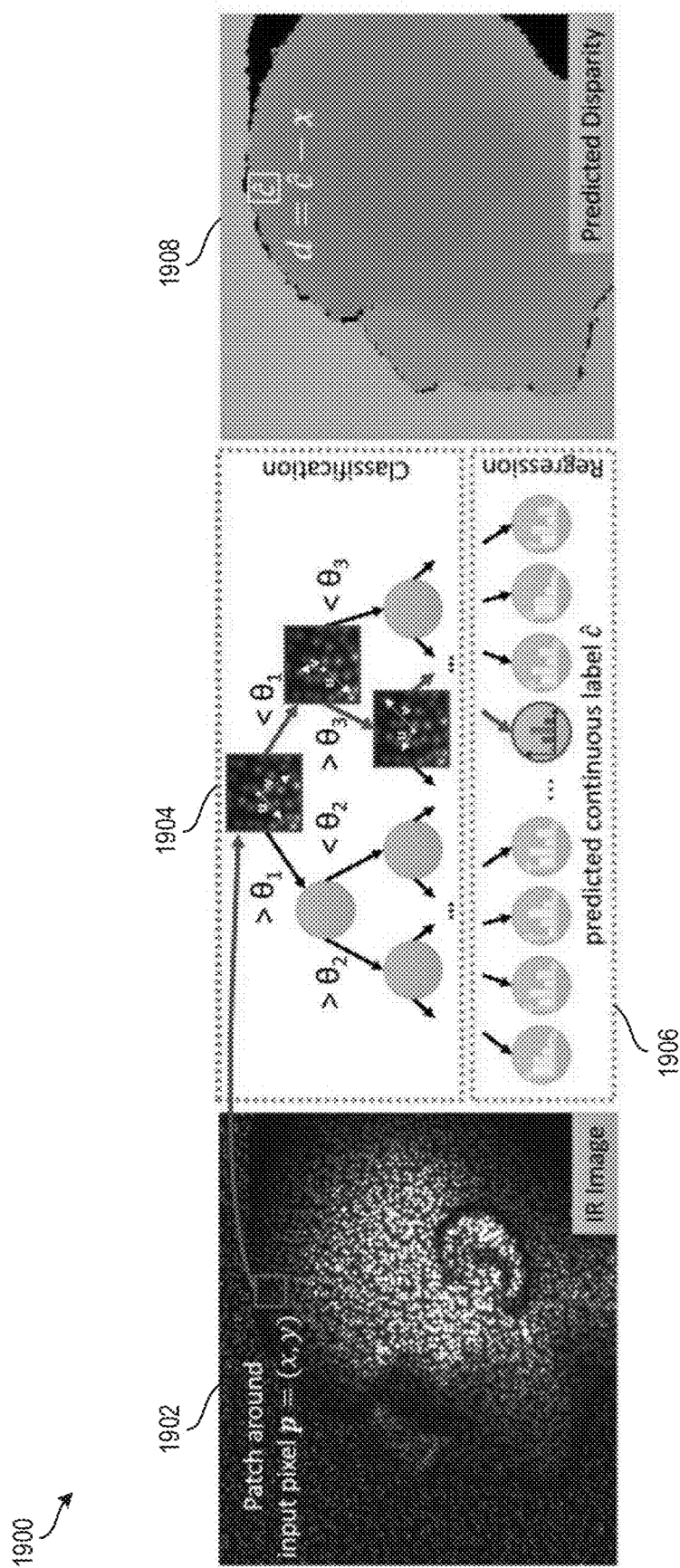
FIG. 19 depicts a random forest approach to training a machine learning model according to one or more embodiments described herein.

As another example, the machine learning model 128 can be trained using a random forest algorithm architecture 1900 as shown in FIG. 19. For example, another possible approach to training a machine learning model is a Hyper-Depth random forest algorithm, which is used to predict a correct disparity in real-time (or near real-time). This is achieved by feeding the algorithm lighting images (e.g., the training data 118), avoiding triangulation to get depth map information, and getting a predicted disparity map for each pixel of the training data 118. This approach to disparity estimation uses decision trees as shown in FIG. 19. The random forest algorithm architecture 1900 takes as input an infrared (IR) image 1902 as training data (e.g., the training data 118), which is an example of a structured lighting image. The IR image 1902 is formed from individual pixels p having coordinates (x,y). The IR image 1902 is passed into a classification portion 1904 of the random forest algorithm architecture 1900. In the classification portion 1904, for each pixel p=(x,y) in the IR image 1902, a random forest function (i.e., RandomForest(middle)) is run that predicts a class c by sparsely sampling a 2D neighborhood around p. The forest starts with classification at the classification portion 1904 then proceeds to performing regression at the regression portion 1906 of the random forest algorithm architecture 1900. During regression, continuous class labels ĉ are predicted that maintain subpixel accuracy. The mapping d=ĉ x gives the actual disparity d(right) for the pixel p. This algorithm is applied to each pixel p, and the actual disparity for each pixel is combined to generate the predicted disparity map 1908.

Figure 20A:
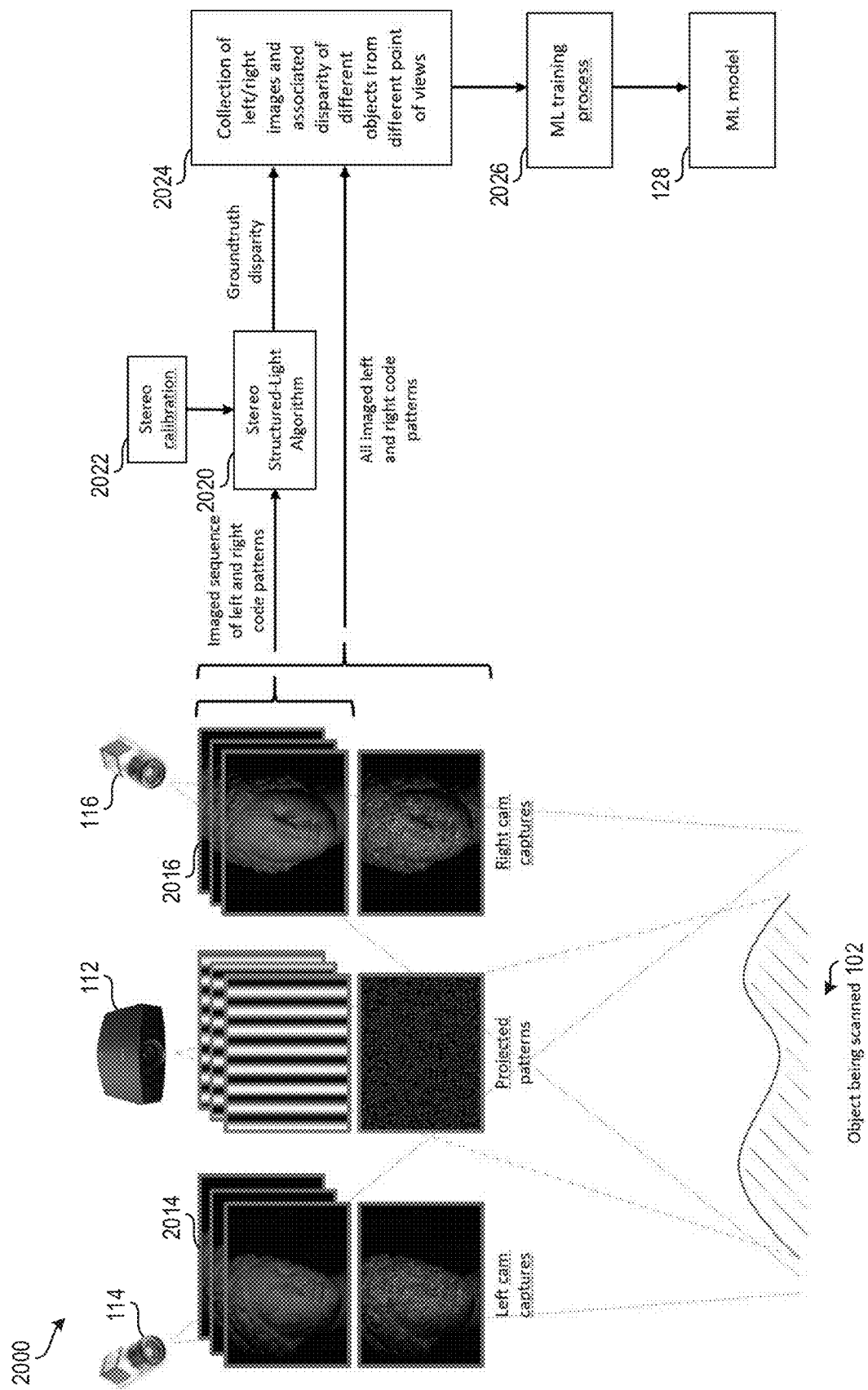
FIGS. 20A and 20B depict a system for training a machine learning model according to one or more embodiments described herein.
Figure 20B:
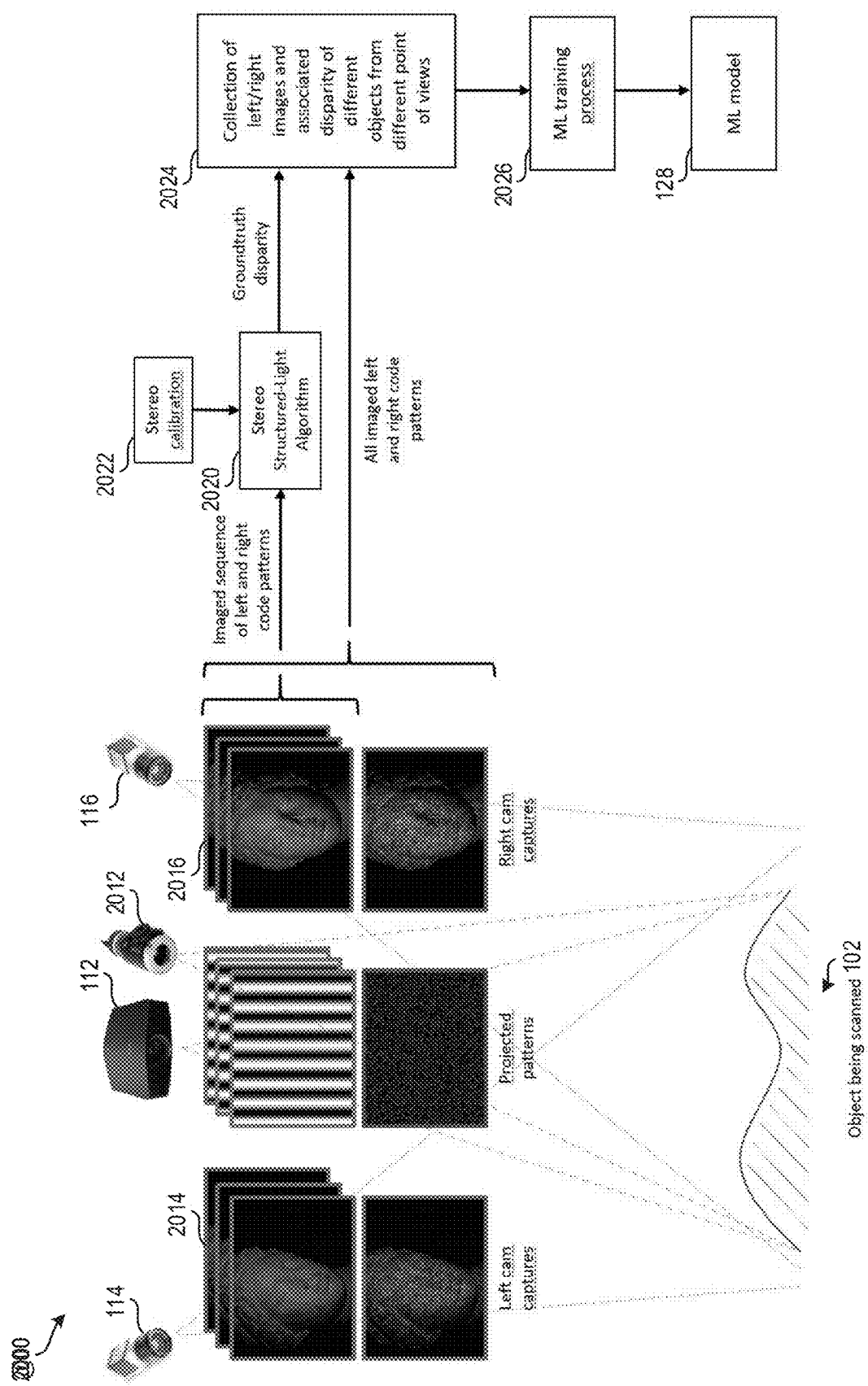

FIGS. 20A and 20B depict a system 2000 for training a machine learning model (e.g., the machine learning model 128) according to one or more embodiments described herein. In this example, the system 2000 includes the projector 112, the left camera 114, and the right camera 116. The cameras 114, 116 form a pair of stereo cameras. The projector 112 projects patterns of light on the object 102 (as described herein), and the left camera 114 and the right camera 116 capture left images 2014 and right images 2016 respectively. In examples, the light patterns are structured light patterns, which are a sequence of code patterns and can be one or more of the following structured light code patterns: a gray code+phase shift, a multiple wave length phase-shift, a multiple phase-shift, etc. In examples, the light pattern is a single code pattern, which can be one or more of the following structured or unstructured light code patterns: sinusoid, pseudorandom, etc.

The projector 112 is a programmable pattern projector such as a digital light projector (DLP), a MEMS projector, a liquid crystal display (LCD) projector, liquid crystal technology on silicon (LCoS) projector, or the like. In some example, as shown in FIG. 20B, a fixed pattern projector 2012 (e.g., a laser projector, a chrome on glass LCD projector, a diffractive optical element (DOE) projector, a MEMS projector, etc.) can also be used.

Once the images 2014, 2016 are captured, they are passed as imaged sequence of left and right code patterns to a stereo structured-light algorithm 2020. The algorithm 2020 calculates a ground truth disparity map. An example of the algorithm 2020 is to search the image (pixel) coordinates of the same "unwrapped phase" value in the two images exploiting epipolar constraint (see, e.g., "Surface Reconstruction Based on Computer Stereo Vision Using Structured Light Projection" by Lijun Li et al. published in "2009 International Conference on Intelligent Human-Machine Systems and Cybernetics," 26-27 Aug. 2009, which is incorporated by reference herein in its entirety). The algorithms 2020 can be calibrated using a stereo calibration 2022, which can consider the position of the cameras 114, 116 relative to one another. The disparity map from the algorithms 2020 is passed to a collection 2024 of left/right images and associated disparity map of different objects from different points of view. The imaged left and right code patterns are also passed to the collection 2024 and associated with the respective ground truth disparity map.

The collection 2024 represents training data (e.g., the training data 118), which is used to train a machine learning model at block 2026. The training is performed, for example, using one of the training techniques described herein (see, e.g., FIGS. 18 and 19). This results in the trained machine learning model 128.

Figure 21:
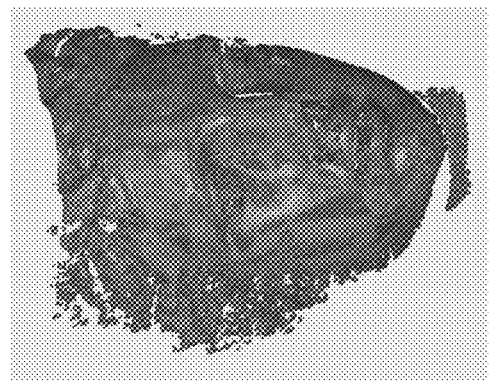
FIG. 21 depicts an example of a ground truth disparity map, an estimated disparity map, and a comparison point cloud image between the ground truth disparity map and the estimated disparity map according to one or more embodiments described herein.
Figure 21:
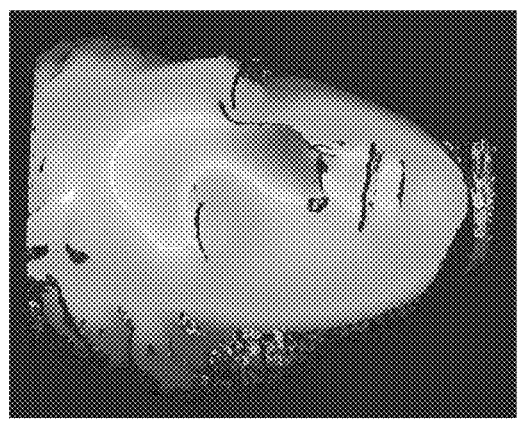
Figure 21:
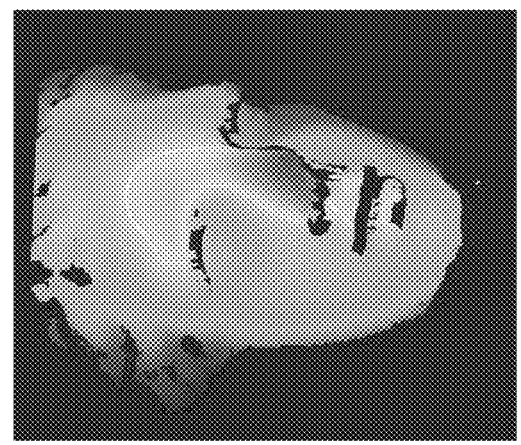

FIG. 21 depicts an example of a ground truth disparity map 2102, an estimated disparity map 2104, and a comparison point cloud image 2106 between the ground truth disparity map 2102 and the estimated disparity map 2104 according to one or more embodiments described herein. The estimated disparity map 2104 can be generated using a machine learning model as described herein. As can be seen in the comparison point cloud image 2006, the estimated disparity map 2104 is an acceptable estimation of the ground truth disparity map 2102.

Figure 22:
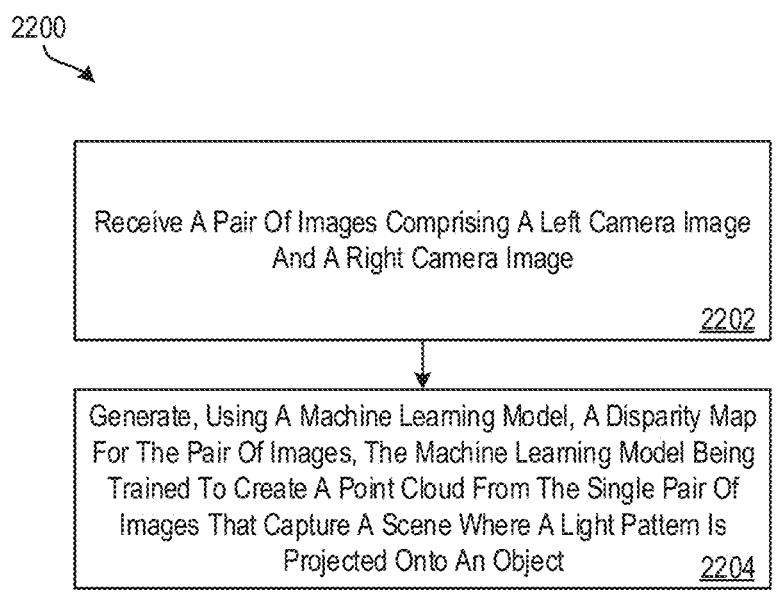
FIG. 22 depicts a method for performing inference using a machine learning model to take as input a single image (or image pair) of an object and provided as output a disparity map that is used to compute 3D point coordinates associated with the object according to one or more embodiments described herein.

Once the machine learning model 118 has been trained, the machine learning model 118 can be used to perform inference. That is, the machine learning model 118 can be used to generate a disparity map for a pair of images. FIG. 22 depicts a flow diagram of a method 2200 for performing inference using a machine learning model to take as input a single image (or image pair of left and right images taken from left and right cameras respectively) of an object and provided as output a disparity map that is used to compute 3D point coordinates associated with the object according to one or more embodiments described herein.

At block 2202, a pair of images are received. The pair of images include a left image and a right image. The pair of images can be captured by any suitable scanner, such as the scanners described herein, including the scanner 110 and/or the scanner 130, among others. As one example, and with reference to FIG. 1, the scanner 130 captures a left image of the object 140 using the left camera 135 and captures a right image of the object 140 using the right camera 136.

At block 2204, a disparity map is generated for the pair of images using the machine learning model 128. As described herein, the machine learning model is trained to create a disparity map that, combined with stereo calibration, creates a point cloud from the pair of images that capture a scene where a light pattern is projected onto an object. As an example, the processor 138 of the scanner 130 generates a disparity map for the pair of images using the machine learning model 128. This is referred to as "edge" processing. As another example, the processing system 120 receives the pair of images from the scanner 130 and, using its processing device 122, generates the disparity map.

Figure 23A:
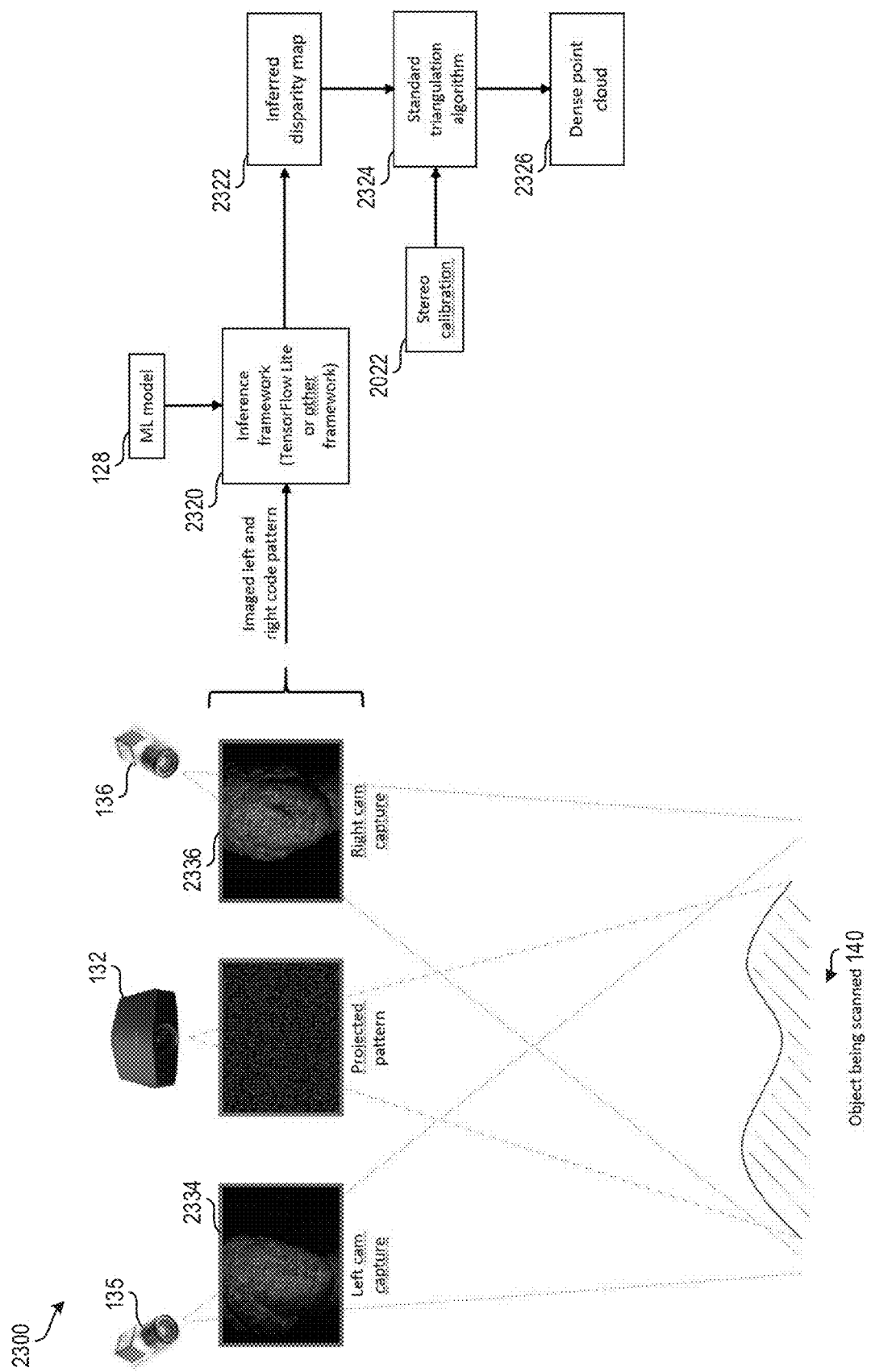
FIGS. 23A and 23B depict a system for performing inference using a machine learning model according to one or more embodiments described herein.
Figure 23B:
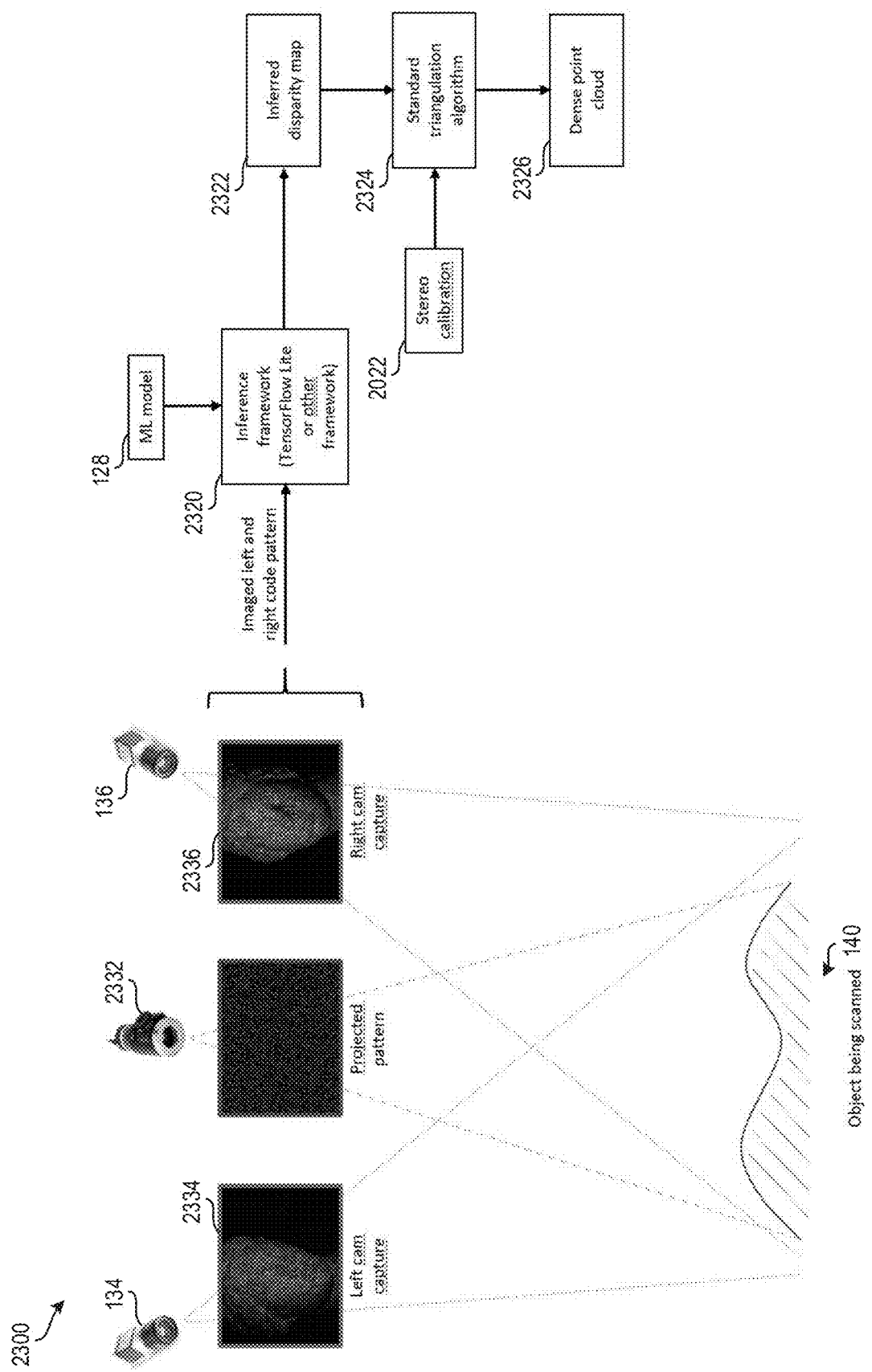

FIGS. 23A and 23B depict a system 2300 for performing inference using a machine learning model (e.g., the machine learning model 128) according to one or more embodiments described herein. In this example, the system 2300 includes the projector 132, the left camera 135, and the right camera 136. The cameras 134, 136 form a pair of stereo cameras. The projector 132 projects a pattern of light on the object 140 (as described herein), and the left camera 135 and the right camera 136 capture left images 2334 and right images 2336 respectively. The pattern of light is a single code pattern, which can be one or more of the following structured or unstructured light code patterns: sinusoid, pseudorandom, etc. In the example of FIG. 23A, the projector 132 is a programmable pattern projector such as a digital light projector (DLP), a MEMS projector, a liquid crystal display (LCD) projector, liquid crystal technology on silicon (LCoS) projector, or the like. In the example of FIG. 23B, a fixed pattern projector 2332 (e.g., a laser projector, a chrome on glass LCD projector, a diffractive optical element (DOE) projector, a MEMS projector, etc.) is used instead of a programmable pattern projector.

The images 2334, 2336 are transmitted as imaged left and right code pattern to an inference framework 2320. An example of the inference framework 2320 is TenserFlow Lite, which is an open source deep learning framework for on-device (e.g., on scanner) inference. The inference framework 2320 uses the machine learning model 128 to generate (or infer) a disparity map 2322. The disparity map 2322 (see, e.g., estimated disparity map 2104) is then used to generate a point cloud using triangulation techniques. For example, a triangulation algorithm (e.g., an algorithm that computes the intersection between two rays, such as a mid-point technique and a direct linear transform technique) is applied to the disparity map 2322 to generate a dense point cloud 2326 (e.g., 3D coordinates 142). The triangulation algorithm can utilize stereo calibration 2022 as described herein (see, e.g., FIGS. 20A and 20B).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
receiving training data collected by three-dimensional (3D) imagers, the training data comprising a plurality of training sets having pairs of training images of scenes where light patterns are projected onto objects; and
generating, using the training data, a machine learning model from which disparity maps are generated from pairs of images;
receiving a captured pair of images comprising a left camera image and a right camera image, the captured pair of images captured by a 3D imager while projecting a light pattern onto an object; and
generating, using the machine learning model, a disparity map for the captured pair of images.

2. The method of claim 1, wherein each a training set comprises a left camera training image, and a right camera training image, and the training data further comprises a disparity training map.

3. The method of claim 2, wherein the disparity map comprises a ground truth disparity map and a visualized disparity map.

4. The method of claim 1, wherein the machine learning model is based on a disparity neural network.

5. The method of claim 1, wherein the machine learning model is based on a random forest algorithm.

6. The method of claim 1, wherein the 3D imager comprises a projector, a first camera, and a second camera arranged in a predetermined geometric arrangement.

7. The method of claim 6, wherein the training data is collected by:
emitting the light pattern onto the object with the projector; and
acquiring a first training image with the first camera and a second training image with the second camera.

8. A system comprising:
a first scanner comprising a first left camera, a first right camera, and a first projector, the first scanner capturing a pair of training images by projecting a first light pattern onto a first object and capturing a first left image of the first object using the first left camera and a first right image of the first object using the first right camera;
a processing system to generate a machine learning model based at least in part on the first left image, the first right image, and a first disparity map calculated using the left image and the right image; and
a second scanner comprising a second left camera, a second right camera, and a second projector, the second scanner capturing a pair of images by projecting a second light pattern onto a second object and capturing a second left image of the second object using the second left camera and capturing a second right image of the second object using the second right camera, the second scanner generating, using the machine learning model, a second disparity map from the second left image and the second right image.

9. The system of claim 8, wherein the machine learning model is based on a disparity neural network.

10. The method of claim 8, wherein the machine learning model is based on a random forest algorithm.

11. A method comprising:
receiving a pair of images, comprising a left camera image and a right camera image, that capture a scene of a light pattern projected on an object;
generating, using a machine learning model, a disparity map for the pair of images, the machine learning model trained to create point clouds from pairs of images having light patterns projected onto objects; and
generating a point cloud by applying a triangulation technique to the disparity map for the pair of images.

12. The method of claim 11, wherein receiving the pair of images comprises capturing, by a scanner, the pair of images.

13. The method of claim 12, wherein the generating the disparity map is performed by the scanner.

14. The method of claim 12, further comprising transmitting the pair of images to a processing system, wherein the generating the disparity map is performed by the scanner.

15. The method of claim 11, wherein receiving the pair of images comprises capturing, by a first scanner, the pair of images, wherein the generating the disparity map is performed by a second scanner.

16. The method of claim 11, wherein receiving the pair of images comprises capturing the pair of images by:
emitting with a projector the light pattern onto the object, the light pattern having at least one element; and
acquiring the left camera image with a first camera and a right camera image with a second camera of the at least one element.

17. The method of claim 11, wherein the triangulation technique further applies a stereo calibration technique to generate the point cloud.

18. The method of claim 11, wherein the machine learning model is based on a disparity neural network.

19. The method of claim 11, wherein the machine learning model is based on a random forest algorithm.

* * * * *

UNITED STATES PATENT AND TRADEMARK OFFICE
CERTIFICATE OF CORRECTION

| | | |
|---|---|---|
| PATENT NO. | : 12,047,550 B2 | Page 1 of 1 |
| APPLICATION NO. | : 17/695352 | |
| DATED | : July 23, 2024 | |
| INVENTOR(S) | : Georgios Balatzis et al. | |

It is certified that error appears in the above-identified patent and that said Letters Patent is hereby corrected as shown below:

On the Title Page

Item (54) and in the Specification, Column 1, Line 1, the title reads "DIMIENSIONAL" and should be corrected to "DIMENSIONAL".

Signed and Sealed this
Twenty-first Day of October, 2025

John A. Squires
*Director of the United States Patent and Trademark Office*